(12) United States Patent
Kitahara

(10) Patent No.: US 7,594,390 B2
(45) Date of Patent: Sep. 29, 2009

(54) COMBUSTION CONTROL APPARATUS AND METHOD FOR INTERNAL COMBUSTION ENGINE

(75) Inventor: Yasuhisa Kitahara, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 71 days.

(21) Appl. No.: 10/895,286

(22) Filed: Jul. 21, 2004

(65) Prior Publication Data

US 2005/0016163 A1 Jan. 27, 2005

(30) Foreign Application Priority Data

Jul. 25, 2003 (JP) ............... 2003-279630

(51) Int. Cl.
*F01N 3/00* (2006.01)
(52) U.S. Cl. .................. 60/285; 60/274; 60/280; 60/295; 60/297; 123/299
(58) Field of Classification Search ........... 60/274, 60/276, 280, 285, 286, 295, 297, 303, 311; 123/295, 299
See application file for complete search history.

(56) References Cited

U.S. PATENT DOCUMENTS

| | | | | |
|---|---|---|---|---|
| 4,727,719 A * | 3/1988 | Mizutani | ............. | 60/611 |
| 6,032,461 A * | 3/2000 | Kinugasa et al. | ............. | 60/295 |
| 6,082,325 A * | 7/2000 | Digeser et al. | ............. | 123/299 |
| 6,167,696 B1 * | 1/2001 | Maaseidvaag et al. | ........ | 60/274 |
| 6,237,326 B1 * | 5/2001 | Russell | ............. | 60/274 |
| 6,378,487 B1 * | 4/2002 | Zukouski et al. | ............. | 123/299 |
| 6,688,279 B2 * | 2/2004 | Ishikawa et al. | ............. | 123/299 |
| 6,804,952 B2 * | 10/2004 | Sasaki et al. | ............. | 60/284 |
| 6,829,890 B2 * | 12/2004 | Gui et al. | ............. | 60/295 |
| 6,901,747 B2 * | 6/2005 | Tashiro et al. | ............. | 60/286 |
| 6,978,604 B2 * | 12/2005 | Wang et al. | ............. | 60/297 |
| 6,990,801 B2 * | 1/2006 | Kitahara | ............. | 60/285 |

(Continued)

FOREIGN PATENT DOCUMENTS

EP    1 035 315 A2    9/2000

(Continued)

OTHER PUBLICATIONS

U.S. Appl. No. 10/895,423, filed Jul. 21, 2004, Kitahara.

(Continued)

*Primary Examiner*—Tu M Nguyen
(74) *Attorney, Agent, or Firm*—Foley & Lardner LLP

(57) ABSTRACT

In combustion control apparatus and method for an internal combustion engine, an exhaust gas purifying section is disposed in an exhaust system of the engine, a determination is made, on the basis of a state of the exhaust gas purifying section, whether a request is issued to switch a combustion mode of the engine to a split retard combustion (predetermined fuel combustion mode) in which a preliminary fuel combustion is carried out at least once at or near to a top dead center and a main fuel combustion to develop a main torque is started after a completion of the preliminary fuel combustion, and the combustion mode of the engine is switched to the split retard combustion when the combustion mode switching request determining section determines that the request is issued and during a transient driving state of the engine.

25 Claims, 17 Drawing Sheets

U.S. PATENT DOCUMENTS 7,017,337 B2 * 3/2006 Plote et al. .................... 60/295

FOREIGN PATENT DOCUMENTS

| | | |
|---|---|---|
| JP | 2757698 B2 | 3/1998 |
| JP | 2000-320386 A | 11/2000 |
| JP | 2001-073860 A | 3/2001 |
| JP | 2002-317670 A | 10/2002 |
| JP | 2003-065121 A | 3/2003 |
| WO | WO 0238933 A1 * | 5/2002 |

OTHER PUBLICATIONS

U.S. Appl. No. 10/895,424, filed Jul. 21, 2004, Nishizawa et al.
U.S. Appl. No. 10/902,422, filed Jul. 30, 2004, Nishizawa et al.
U.S. Appl. No. 10/895,407, filed Jul. 21, 2004, Ishibashi et al.
U.S. Appl. No. 10/895,335, filed Jul. 21, 2004, Kitahara.
U.S. Appl. No. 10/902,163, filed Jul. 30, 2004, Kitahara.
U.S. Appl. No. 10/895,409, filed Jul. 21, 2004, Kitahara.
U.S. Appl. No. 10/895,408, filed Jul. 21, 2004, Kitahara.
U.S. Appl. No. 10/902,162, filed Jul. 30, 2004, Todoroki et al.

* cited by examiner

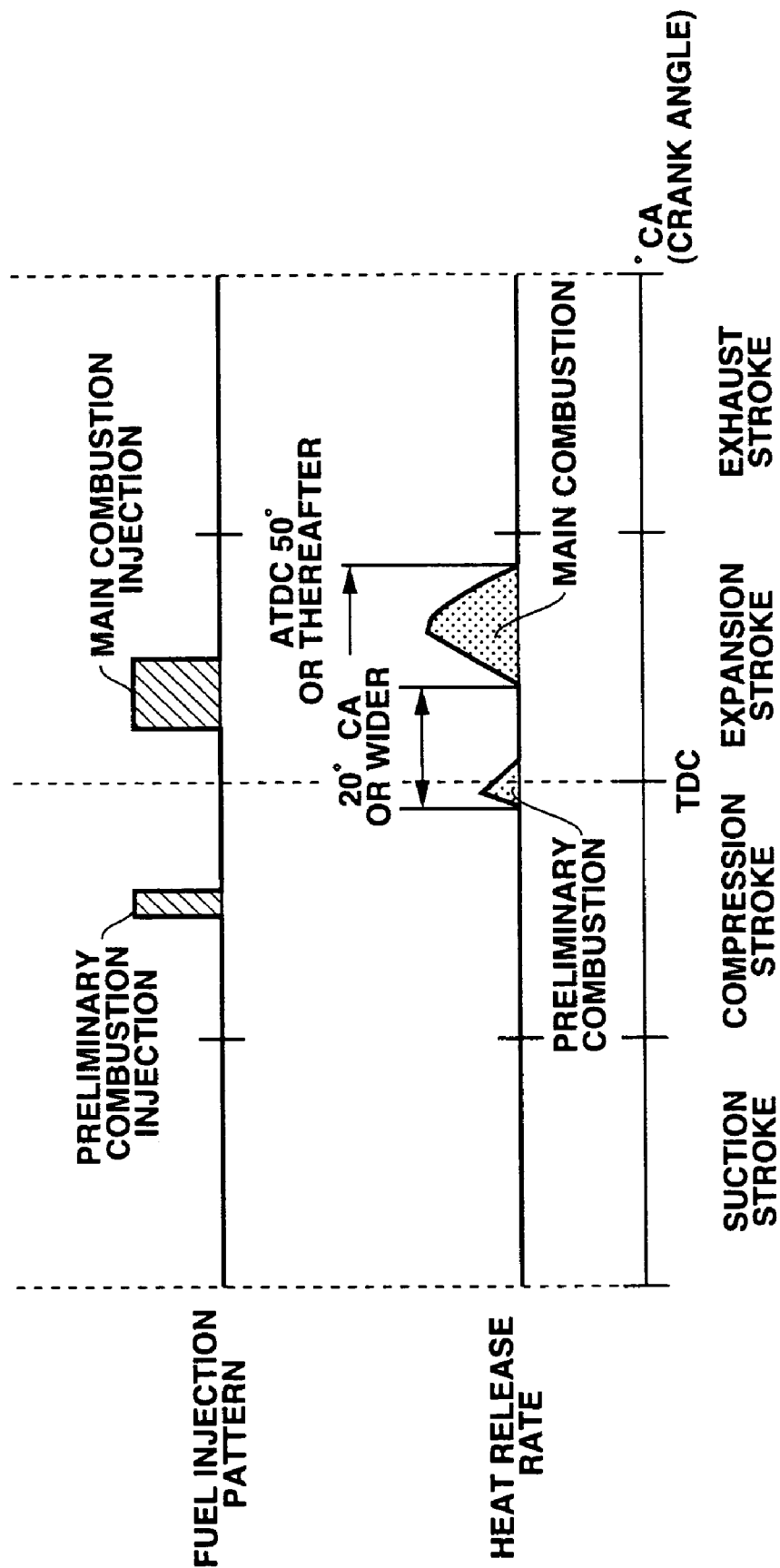

TARGET FUEL INJECTION TIMING FOR MAIN COMBUSTION

TARGET FUEL INJECTION QUANTITY
FOR PRELIMINARY COMBUSTION

TARGET FUEL INJECTION TIMING
FOR PRELIMINARY COMBUSTION

COMBUSTION CONTROL APPARATUS AND METHOD FOR INTERNAL COMBUSTION ENGINE

BACKGROUND OF THE INVENTION

1. Field of the Invention

The present invention relates to combustion control apparatus and method for an internal combustion engine having an exhaust system in which an exhaust gas purifying device is equipped. The present invention especially relates to the combustion control apparatus and method for the internal combustion engine which are capable of controlling a combustion in accordance with a state of the exhaust gas purifying device.

2. Description of the Related Art

A Japanese Patent Application First Publication No. 2000-320386 published on Nov. 21, 2000 (which corresponds to a European Patent Application Publication No. EP 1 035 315 A2 published on Sep. 13, 2000) exemplifies a previously proposed combustion control apparatus for a Diesel engine in which a fuel injection quantity determined in accordance with a requested output when a temperature rise of a catalyst is promoted is split and injected a plural number of times at or near to a top dead center in a combustion stroke in order to continue the combustion caused by the fuel injection.

SUMMARY OF THE INVENTION

Since, in the above-described Japanese Patent Application First Publication, the combustion cause by the fuel split injection is continued, the injection at twice or thereafter is a fuel injected during a flame propagation of the fuel injected at a previous time. Hence, the fuel injected at twice or thereafter provides a combustion mainly on a diffusive combustion. In the case of the mainly diffusive combustion, an air-fuel ratio is enriched. At this time, air-fuel ratio is partially remarkably enriched so that a large quantity of smokes are developed. In a case where an exhaust gas air-fuel ratio is, for example, enriched so as to regenerate the exhaust gas purifying device by means of the previously proposed combustion control apparatus, the large quantity of smokes are developed.

It is, hence, an object of the present invention to provide combustion control apparatus and method for an internal combustion engine which are capable of controlling a combustion to a combustion state in accordance with a state of the catalyst (exhaust gas) purifying device without worsening the exhaust gas purification due to the smokes.

According to one aspect of the present invention, there is provided a combustion control apparatus for an internal combustion engine, comprising: an exhaust gas purifying section disposed in an exhaust system of the engine; a combustion mode switching request determining section that determines, on the basis of a state of the exhaust gas purifying section, whether a request is issued to switch a combustion mode of the engine to a predetermined fuel combustion mode in which a preliminary fuel combustion is carried out at least once at or near to a top dead center and a main fuel combustion to develop a main engine torque is started after a complete end of the preliminary fuel combustion; and a combustion mode switching section that switches the combustion mode of the engine to the predetermined fuel combustion mode when the combustion mode switching request determining section determines that the request is issued and during a transient driving state of the engine.

According to another aspect of the present invention, there is provided a combustion control method for an internal combustion engine, the engine comprising an exhaust gas purifying section disposed in an exhaust system of the engine, and the method comprising: determining, on the basis of a state of the exhaust gas purifying section, whether a request is issued to switch a combustion mode of the engine to a predetermined fuel combustion mode in which a preliminary fuel combustion is carried out at least once at or near to a top dead center and a main fuel combustion to develop a main engine torque is started after a complete end of the preliminary fuel combustion; and switching the combustion mode of the engine to the predetermined fuel combustion mode when determining that the request to switch the combustion mode to the predetermined fuel combustion mode is issued and during a transient driving state of the engine.

This summary of the invention does not necessarily describe all necessary features so that the present invention may also be sub-combination of these described features.

BRIEF DESCRIPTION OF THE DRAWINGS

FIG. 2 is an explanatory view representing an injection pattern of a split retard combustion (a combustion mode for a regeneration) and a combustion pattern thereof in the preferred embodiment of the combustion control apparatus according to the present invention.

DETAILED DESCRIPTION OF THE PREFERRED EMBODIMENT

Reference will hereinafter be made to the drawings in order to facilitate a better understanding of the present invention.

Figure 1:
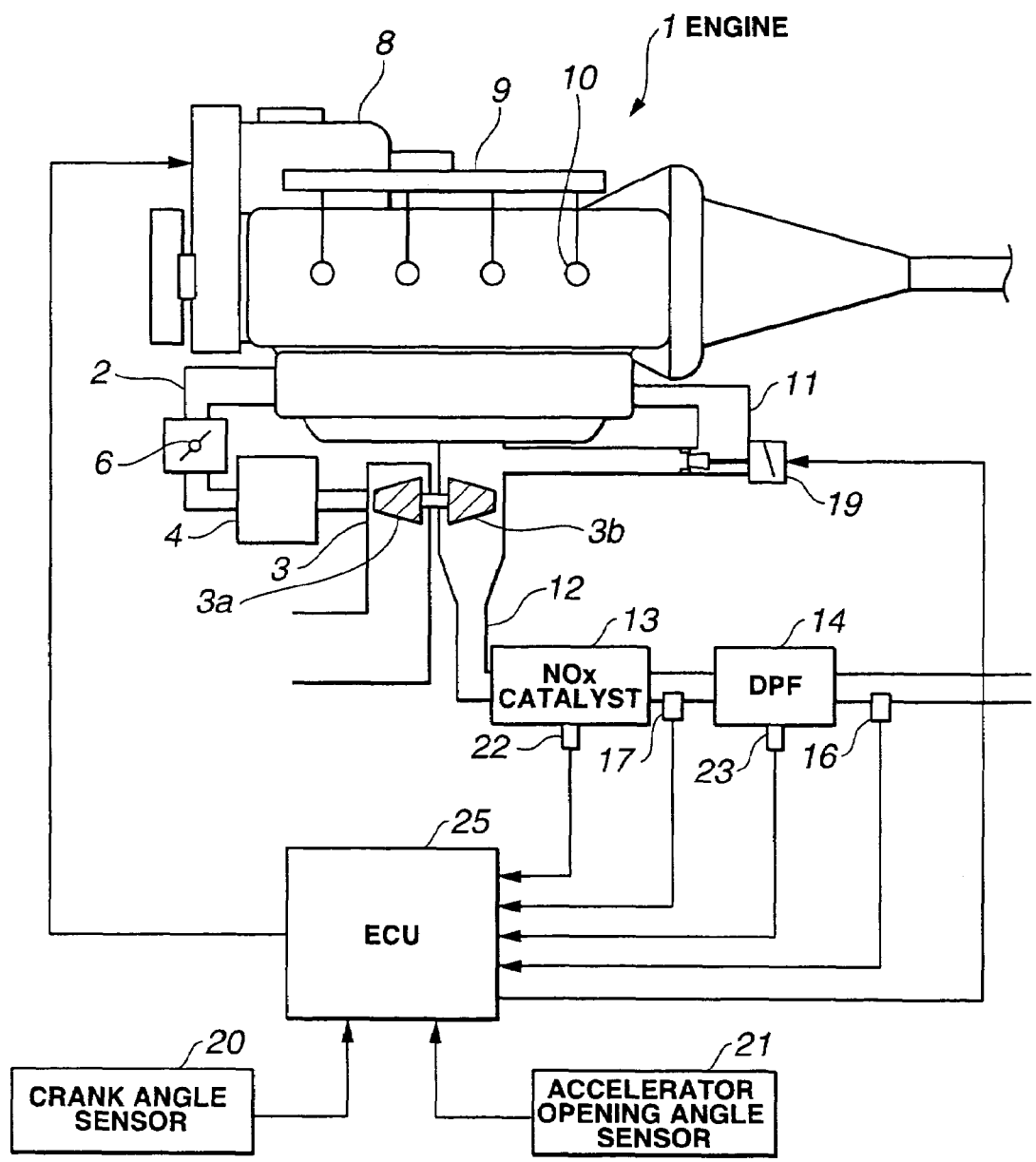
FIG. 1 is a system configuration view of a combustion control apparatus for an internal combustion engine in a preferred embodiment according to the present invention.

FIG. 1 shows a system configuration of a combustion control apparatus for a Diesel engine 1 as a vehicular internal combustion engine. A compressor 3a for a turbo charger 3 is disposed at an upstream portion of an intake air passage 2 of engine 1. Sucked air is turbo charged by means of compressor 3a and, thereafter, cooled by means of an intercooler 4. Thereafter, the sucked air is passed through an intake air throttle valve 6 and caused to flow into a combustion chamber of each engine cylinder. On the other hand, a fuel is highly pressurized by means of a fuel injection pump 8 and is supplied to a common rail 9. The highly pressurized fuel is directly injected into the combustion chamber from a corresponding fuel injection valve 10. That is to say, a common rail type fuel injection device is constituted by fuel injection pump 8, common rail 9, and fuel injection valves 10 for respective cylinders.

An air-fuel mixture generated by the air streamed into the combustion chamber and by the fuel injected into the same combustion chamber is combusted through a compression ignition and an exhaust gas is exhausted into an exhaust passage 12. A part of the exhaust gas exhausted to exhaust passage 12 is re-circulated toward an intake air side via exhaust gas recirculation passage 11 in which an exhaust gas recirculation control valve 19 is interposed. A remaining of the exhaust gas causes a turbine 3b of a turbo charger 3 to be drivingly revolved and the sucked air is turbocharged by means of compressor 3a installed coaxially on turbine 3b. An NOx trap catalyst 13 and Diesel Particulate Filter 14 (hereinafter, simply referred to as DPF) are disposed in this sequence from an upstream side at a downstream portion to turbine 3b of exhaust passage 12. NOx trap catalyst 13 is a catalyst which traps NOx in the exhaust gas when an exhaust gas air-fuel ratio is leaner than a stoichiometric air-fuel ratio and which releases and purifies NOx when the exhaust gas air-fuel mixture ratio is richer than the stoichiometric air-fuel ratio. It is noted that NOx trap catalyst 13 carries an oxidation catalyst (a noble metal such as Pt) to oxidize HC (Hydro carbon) and CO (Carbon monoxide). DPF 14 has a function to trap particulate matters (so-called, PM) within the exhaust gas. It is noted that DPF 14 has the function to carry the oxidation catalyst (noble metal such as Pt) to oxidize exhaust gas components (HC and CO). It is also noted that an arrangement relationship between NOx trap catalyst 12 and DPF 14 may be reversed, NOx trap catalyst 13 may be disposed at the downstream side of DPF 14, or DPF 14 and NOx trap catalyst 13 may be integrated.

An ECU (abbreviation for Engine Control Unit but hereinafter referred simply to as ECU) 25 inputs detection signals from various sensors to control engine 1. Various sensors include: a revolution speed sensor (crank angle sensor) 20 to detect an engine speed Ne; an accelerator opening angle sensor 21 to detect an opening angle of an accelerator opening angle APO; a catalyst temperature sensor 22 to detect a temperature of NOx trap catalyst 13; an exhaust gas pressure sensor 17 to detect an exhaust gas pressure at an inlet side of DPF 14; a DPF temperature sensor 23 to detect a temperature of DPF 14; and an air-fuel ratio sensor 16 to detect an exhaust gas air-fuel ratio at an outlet side of DPF 14. It is noted that the temperatures of NOx trap catalyst 13 and DPF 14 may be estimated from an output of exhaust gas temperature sensors disposed at downstream sides of these catalyst 13 and DPF 14 and on the basis of exhaust gas temperatures of these sensors.

ECU 25, on the basis of detection signals from various sensors, outputs a fuel injection command signal to control a fuel injection quantity and a fuel injection timing, a opening angle command signal to the intake air throttle valve 6, and an opening angle command signal to exhaust gas recirculation control valve 19. In addition, ECU 25 performs a regeneration process for NOx trap catalyst 13 and DPF 14 (exhaust gas purifying section (means)). As the generation process, ECU 25 carries out a process in which the particulate matters PM accumulated on DPF 14 is oxidized at a high temperature and under a lean atmosphere; a process to release and reduce NOx accumulated on NOx trap catalyst; and a process to release a sulfur poisoning of NOx trap catalyst 13 at a high temperature and under a rich atmosphere.

Engine 1, in the preferred embodiment, carries out a preliminary fuel combustion (or simply a preliminary combustion) prior to a main fuel combustion (or simply main combustion) in order to relieve an initial abrupt combustion under an ordinary driving and under a lean condition. The preliminary injection timing is set to 40° through 10° BTDC (Before Top Dead Center), the preliminary injection quantity is set to 1 through 3 mm$^3$/st (st=stroke), and the main combustion injection timing is set to about 10° through −20° BTDC, and an interval between the preliminary fuel combustion injection and the main fuel combustion injection is set to about 10° through 30° CA (crank angle). On the other hand, during the enrichment of the exhaust gas air-fuel ratio and/or the regeneration of NOx trap catalyst 13 and DPF 14 requiring a high exhaust gas temperature, a combustion mode is switched into a split retard combustion which is a combustion mode for the regeneration different from the ordinary combustion mode. In a case where the setting of the preliminary injection during the combustion mode under the normal driving, an in-cylinder compression end temperature is reduced when the intake air quantity is throttled to enrich the air-fuel ratio. Therefore, even if the injection timing of the main injection is tried to be retarded in order to raise the exhaust gas temperature at the same time of the enrichment of the air-fuel ratio, the retardation of the injection timing of the main injection cannot be achieved as requested. For example, such a drive requiring the sulfur poisoning release that an excess air rate λ is equal to or lower than 1 and the drive of the exhaust gas temperature of 600° C. or higher cannot be achieved. Therefore, when DPF regeneration is requested, in this embodiment, the combustion mode is switched into the split retard combustion which is different from the ordinary combustion mode so that the rich air-fuel ratio requested and/or the high exhaust gas temperature can be achieved.

In the split retard combustion, the fuel injection is controlled in such a way that the preliminary combustion is carried out once at least at or near to the (upper) top dead center and the main combustion is carried out which is started after a complete end of the preliminary combustion to generate a main torque. FIG. 2 shows a fuel injection pattern and a heat release rate in the split retard combustion. In the split retard combustion, the fuel is, at first, injected at a compression stroke to perform a preliminary combustion to increase an in-cylinder temperature in the vicinity to a compression stroke top dead center (TDC).

The injection quantity during the fuel injection for the preliminary combustion at the compression stroke is a quantity required for the in-cylinder temperature during the fuel injection of the main combustion to exceed a self ignitable temperature. The in-cylinder temperature is raised by means of the preliminary combustion carried in the vicinity to (upper) top dead center so that the retardation of the main combustion can be carried out.

It is noted that the preliminary combustion in the split retard combustion may be carried out a plural number of times for one cycle and the fuel injection is carried out in such a way that at least once combustion from among a plurality of number of times the preliminary combustions are carried out occurs at or near to compression stroke upper top dead center at one cycle. In addition, the preliminary combustion in the split retard combustion may be carried out in such a way that the in-cylinder compression end temperature is estimated from the driving state of engine 1 (engine speed Ne and fuel injection quantity) and the fuel injection for the preliminary combustion quantity and/or fuel timing may be modified in accordance with the compression end temperature. On the other hand, in the split retard combustion, the fuel for the main combustion is injected after the upper top dead center to start the main combustion after the end of the preliminary combustion.

The fuel injection timing for the main combustion is controlled in such a way that a combustion start timing of the main combustion becomes a timing separated from a combustion start timing of a preliminary combustion by 20° crank angle or wider. Thereby, a rate of a pre-mixture combustion of the main combustion can be increased and an exhaust of the smoke can be suppressed. A combustion end timing of the main combustion in the split retard combustion is controlled at a timing separated from the compression stroke top dead center by 50 degrees or wider in the crank angle. In the split retard combustion constituted by the preliminary combustion and the main combustion, the preliminary combustion widens a retard limitation of the main combustion so that a controllability to a target exhaust gas temperature can be improved. In addition, since the main combustion is started after the end of the preliminary combustion, a rate of the pre-mixture of the main combustion is increased so that the increase in the smoke due to the enriched air-fuel ratio can be suppressed.

Figure 3A:
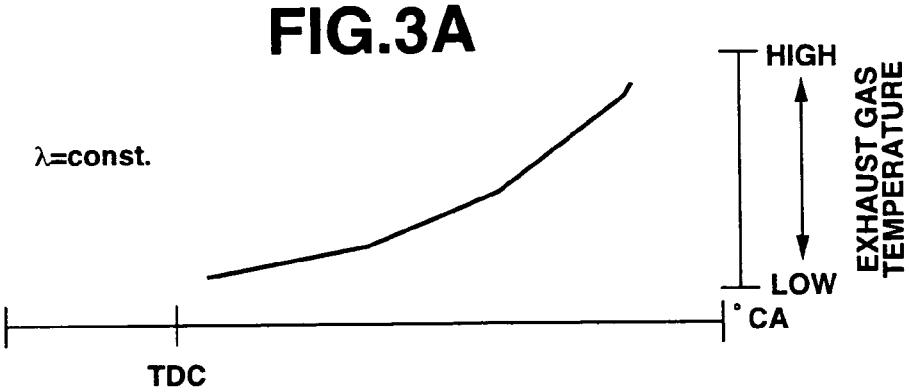
FIGS. 3A, 3B, 3C, and 3D are characteristic graphs representing a state of exhaust gas for a main combustion timing of the split retard combustion in the preferred embodiment of the combustion control apparatus shown in FIG. 1.
Figure 3B:
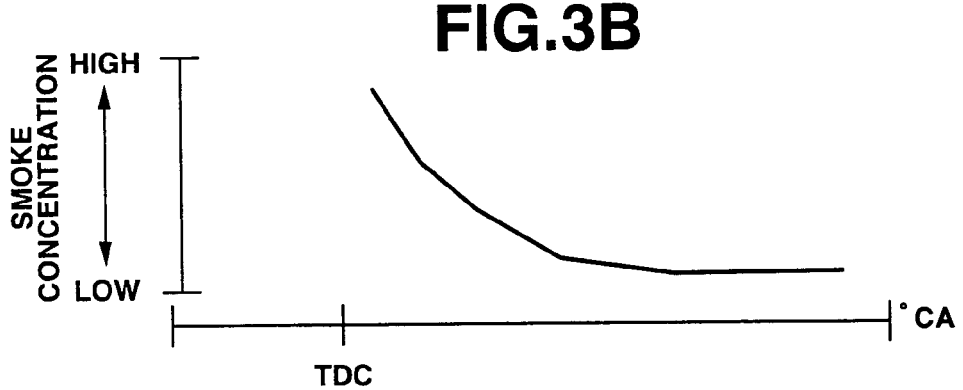
Figure 3C:
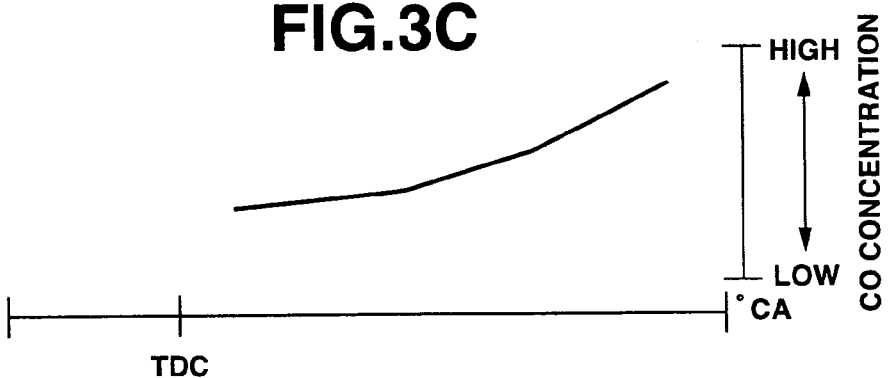
Figure 3D:
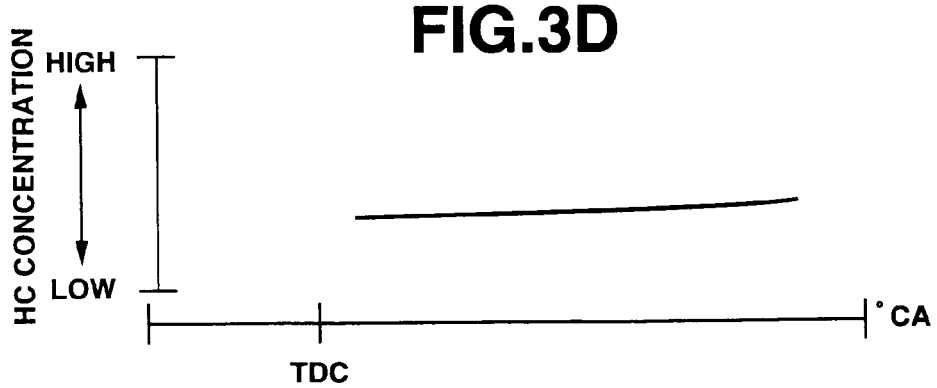

FIGS. 3A through 3D show states of the exhaust gas with respect to the main combustion timing in the split retard combustion. FIG. 3A shows a state of the exhaust gas temperature, FIG. 3B shows a state of a smoke concentration, FIG. 3C shows a state of CO concentration, and FIG. 3D shows a state of HC concentration. As shown in FIGS. 3A through 3D, when the timing of the main combustion is retarded, the rate of a pre-mixture combustion of the main combustion is accordingly increased. Hence, the smoke is suppressed and, at the same time, the exhaust gas temperature is increased along with the retard of the main combustion.

Figure 4:
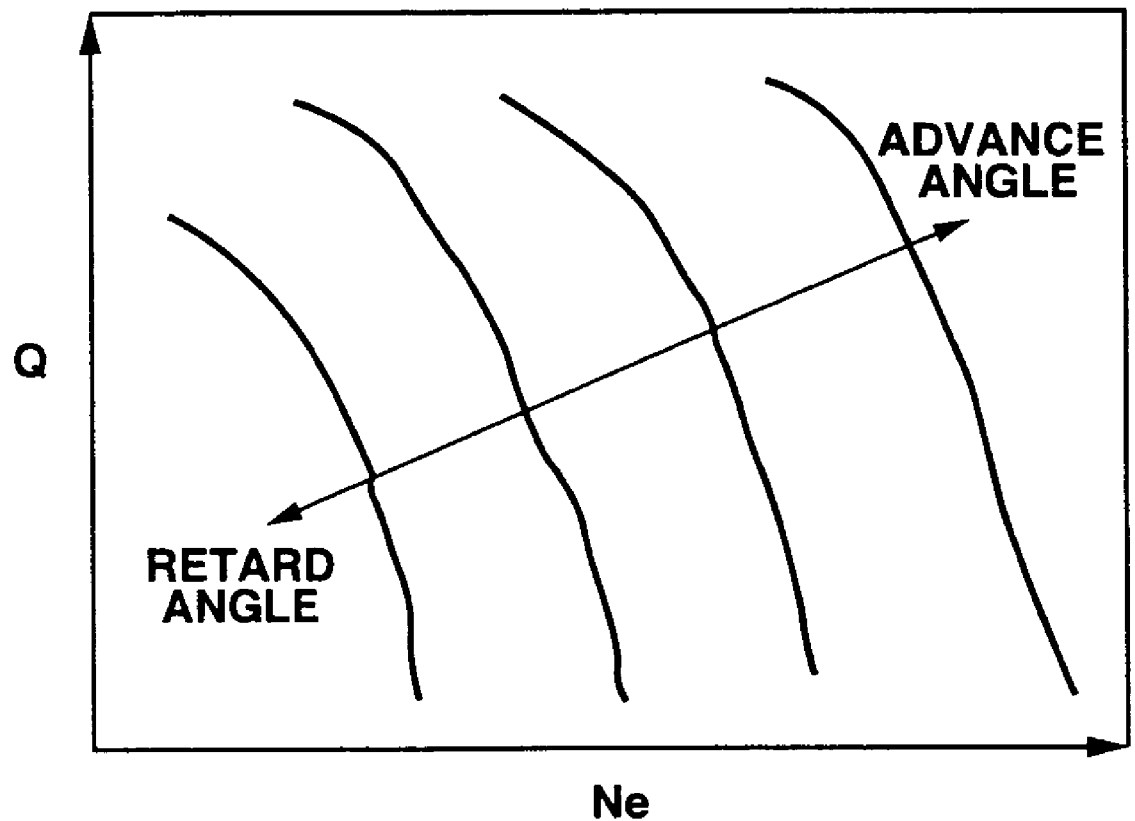
FIG. 4 is a characteristic graph representing a characteristic of a fuel injection timing for the main combustion timing of the split retard combustion in the preferred embodiment of the combustion control apparatus shown in FIG. 1.
Figure 5:
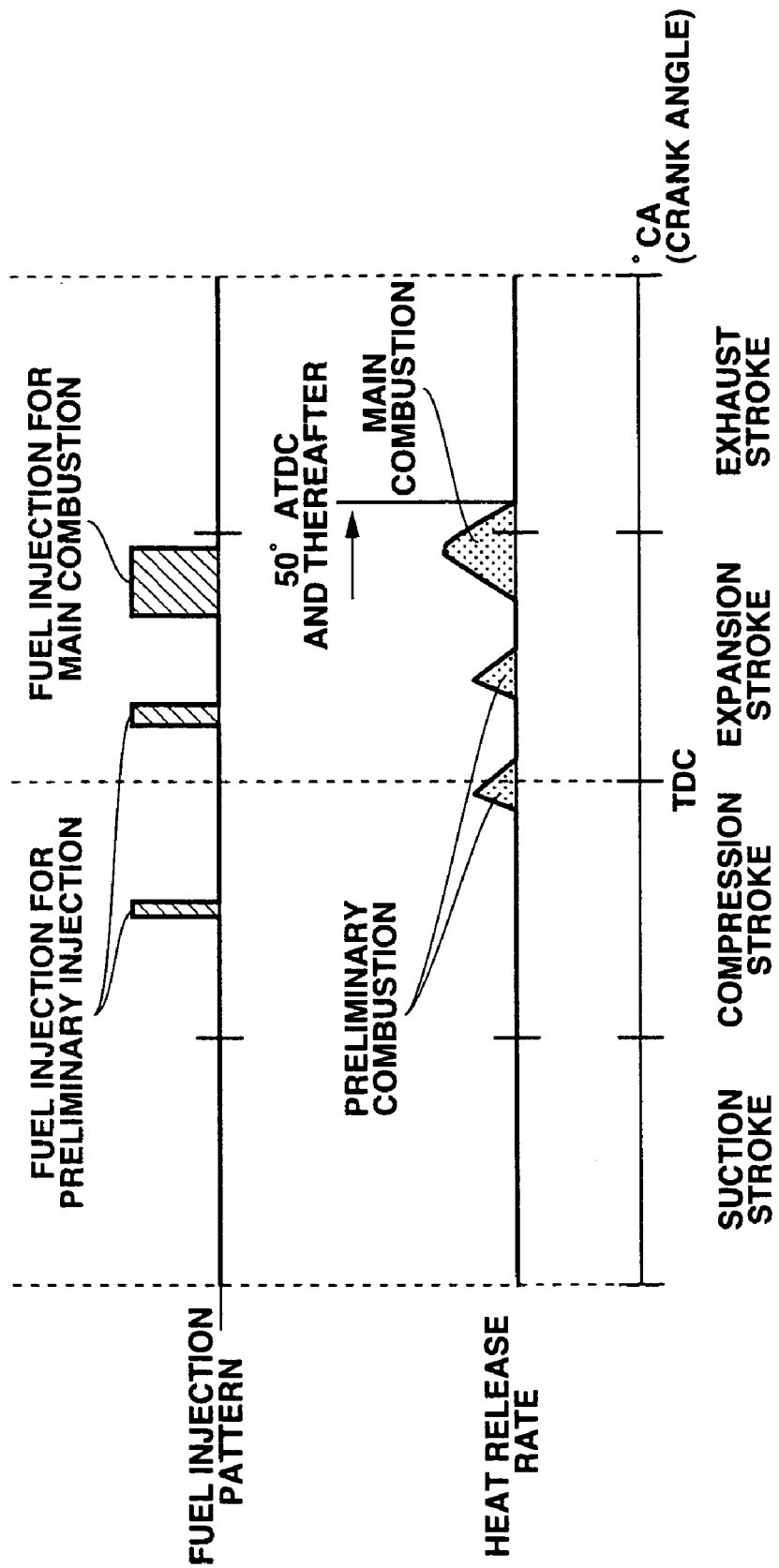
FIG. 5 is an explanatory view representing another injection pattern of the split retard combustion and another combustion pattern thereof in the preferred embodiment of the combustion control apparatus shown in FIG. 1.

FIG. 4 shows a target fuel injection timing for the main combustion. In FIG. 4, a lateral axis denotes engine speed Ne and a longitudinal axis denotes fuel injection quantity Q. As shown in FIG. 4, in a low-load-and-low-engine-speed region, it is necessary to retard largely the main combustion in order to achieve a target exhaust gas temperature. There is a possibility that a mere once preliminary combustion cannot maintain the in-cylinder temperature at a high degree of temperature. In this case, as shown in FIG. 5, it is possible to retard the main combustion a timing at which a requested high exhaust gas temperature is achieved even under the low-load-and-low-engine-speed condition by carrying out the preliminary combustions by a plural number of times in such a way that their respective heat releases are not overlapped.

Figure 6:
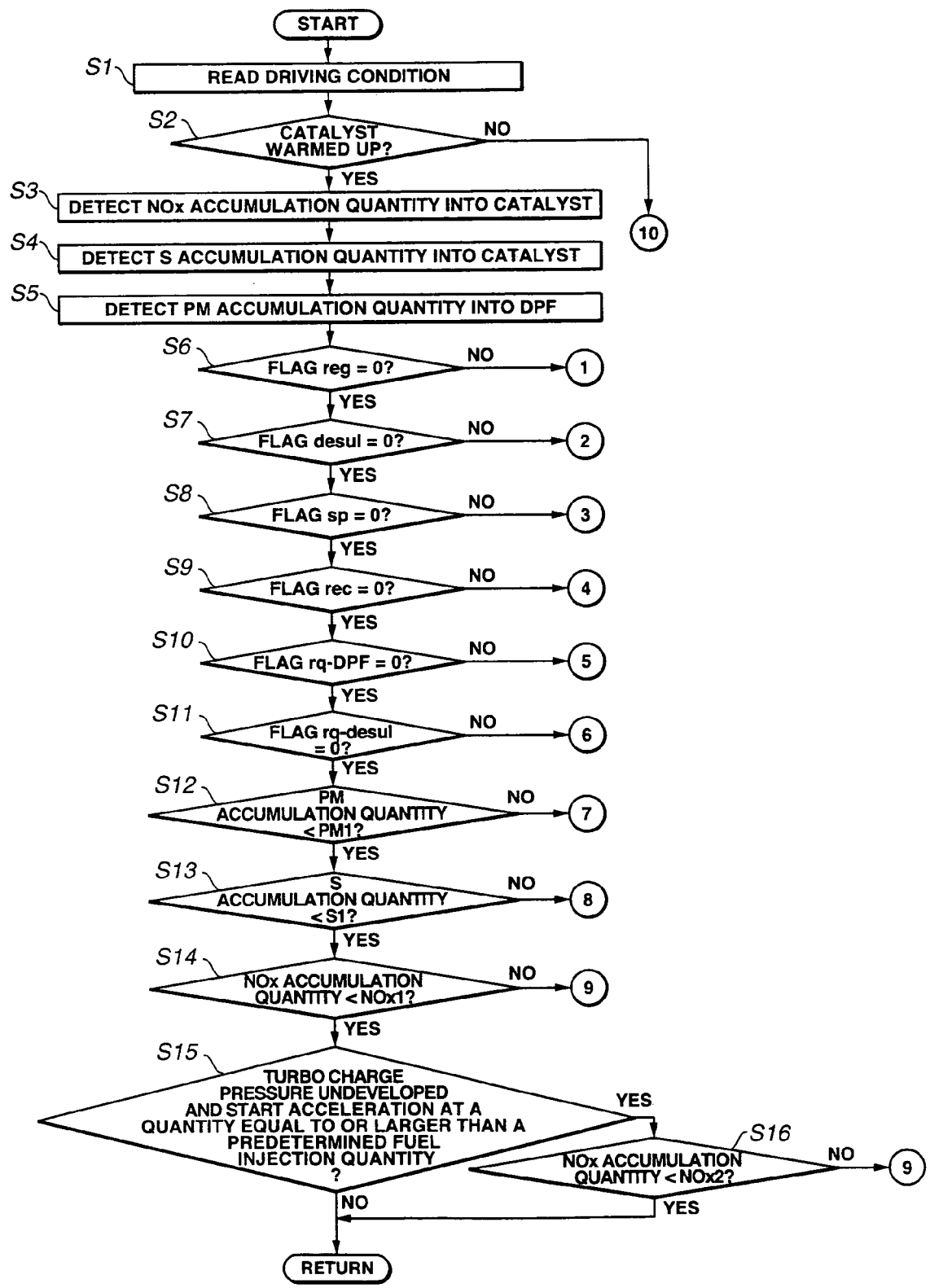
FIG. 6 is a flowchart representing a main routine of a regeneration control in the combustion control apparatus in the preferred embodiment shown in FIG. 1.

Next, a detailed explanation of a regeneration control of DPF 14 and NOx trap catalyst 13 will be made with reference to FIGS. 6 through 17. FIG. 6 shows a flowchart representing a main routine of the regeneration control. At a step S1, ECU 25 reads engine driving condition such as engine revolution speed Ne, accelerator opening angle APO, the temperature at NOx trap catalyst 13, exhaust gas pressures at inlet and outlet sides of DPF 14, and a temperature of DPF 14. In addition, at step S1, ECU 25 reads fuel injection quantity Q calculated from a map with engine speed Ne and accelerator opening angle APO as parameters. At a step S2, ECU 25 determines whether NOx trap catalyst 13 is in the activation state (warmed-up state). This determination is made whether exhaust gas temperature T calculated on the basis of the output signal of exhaust gas temperature sensor 15 at the outlet of NOx trap catalyst 13 is higher than a predetermined exhaust gas temperature T5 during a start of the activation of NOx trap catalyst 13. If exhaust gas temperature T is higher than predetermined exhaust gas temperature, ECU 25 determines that NOx trap catalyst is in the activation state and the routine goes to a step S3. If exhaust gas temperature T is equal to or lower than predetermined exhaust gas temperature T5 (No), ECU 25 determines that NOx trap catalyst is in a non-activation state and the routine goes to a step S1001 shown in FIG. 16. After step 1001, a control to promote the activation of Nox trap catalyst is advanced but the detailed description thereof will be described later. At step S3, ECU 25 estimates a quantity of NOx accumulated into NOx trap catalyst 13. This NOx accumulated quantity can be estimated from engine speed Ne and accumulated value of a vehicular travel distance. It is noted that a result of estimation is reset at a time point at which the release and reduction process of NOx have completed (including the case where the execution of the sulfur poisoning release causes the simultaneous process of the release and reduction process of NOx).

At a step S4, ECU 25 estimates a quantity of sulfur component (SOx) accumulated in NOx trap catalyst 13. It is noted that S shown in FIG. 6 denotes SOx. The estimation of sulfur component accumulated quantity is carried out from engine speed Ne and the accumulated value of the vehicular travel distance in the same way as NOx accumulated quantity described above and resets the result of estimation at a time point at which a sulfur poisoning release is completed. At a step S5, ECU 25 estimates a quantity of particles PM accumulated into DPF 14. The accumulated quantity of particulate matters (PM) is estimated by comparing the exhaust gas temperature the exhaust gas pressure at the inlet side of DPF 14 detected by means of exhaust gas pressure sensor 17 with a reference exhaust gas pressure in accordance with the present driving condition (engine speed Ne and fuel injection quantity). It is noted that the accumulated quantity of particulate matters PM can be estimated from the travel distance from the regeneration time point of DPF 14 detected by exhaust gas pressure sensor 17 or the accumulated value of engine speed Ne. Furthermore, the accumulation quantity of the particulate matters (PM) can be estimated from a combination of the accumulated value of the travel distance or engine speed Ne, and the exhaust gas pressure. At a step S6, ECU 25 determines a status of a flag reg representing whether DPF 14 is in a regeneration mode (oxidation process of the particulate matters PM). If flag reg is zeroed (flag reg=0) and ECU 25 determines that DPF 14 is not in the regeneration mode, the routine goes to a step S7. If flag reg=1 and ECU 25 determines that DPF 14 is in the regeneration mode, ECU 25 performs the processing of a DPF regeneration mode shown in the flowchart shown in FIG. 7. At step S7, ECU 25 determines a status of a flag desul indicating whether NOx trap catalyst 13 is in a sulfur poisoning release mode or not. Then, if flag desul=0 and it is not in the sulfide poisoning release mode, the routine goes to a step S8. If flag desul=1 and ECU 25 determines that NOx trap catalyst 13 is in the sulfur poisoning release mode, ECU 25 carries out a processing of the sulfur poisoning release mode shown in the flowchart of FIG. 8.

At step S8, ECU 25 determines a status of a flag sp indicating whether engine 1 is in a rich spike mode to temporarily enrich the exhaust gas air-fuel ratio in order to release and reduce NOx accumulated in NOx trap catalyst 13. If flag sp=0 and engine 1 is not in the rich spike mode, the routine goes to a step S9. On the other hand, if flag sp=1 and ECU 25 determines that engine 1 is in the rich spike mode, ECU 25 carries out a processing of the rich spike mode representing a flowchart shown in FIG. 9. At step S9, ECU 25 determines a status of a flag rec indicating whether engine 1 is in a melt down preventing mode after DPF regeneration mode or sulfur poisoning release mode. Then, if ECU 25 determines that flag rec=0 and engine 1 is not in the melt down preventing mode, the routine goes to a step S10. If ECU 25 determines that flag rec=1 and engine 1 is in the melting down preventing mode, ECU 25 carries out a processing of the melting down preventing mode shown in a flowchart of FIG. 10.

At step S10, ECU 25 determines whether a status of a flag rg-DPF indicating whether a regeneration request on PDF 14 is issued or not. On the other hand, if rq-DPF flag=0 and that DPF regeneration request is determined not to be issued, the routine goes to a step S11. If ECU 25 determines that rg-DPF=1 and the regeneration request of DPF is issued, ECU 25 carries out the transfer process to the regeneration mode in accordance with a priority sequence shown in the flowchart of FIG. 11. At step S11, ECU 25 determines a status of a flag of rq-desul indicating whether a sulfur poison release request for NOx trap catalyst 13 is issued. If ECU 25 determines that flag rq-desul=0 and that no request of the poisoning release is issued, the routine goes to a step S12. If ECU 25 determines that flag rq-desul=1 and that the poisoning release flag request is issued, the transfer process to the regeneration mode in accordance with the priority sequence is carried out. At step S12, ECU 25 determines whether the PM accumulated quantity at DPF 14 calculated at step S5 has reached to a predetermined quantity PM1 (for example, 2 g/L) required for the regeneration, namely, determines whether it becomes a timing at which DPF 13 is regenerated. If ECU 25 determines that PM accumulated quantity<PM1 and it is not at the timing for DPF regeneration, the routine goes to a step S13. If PM accumulated quantity≧PM1 and ECU 25 determines that it is the PDF regeneration timing, the routine goes to a step S701 of the flowchart shown in FIG. 13, setting flag rq-DPF being set to "1" and issuing the regeneration request for DPF 13.

At step S13, ECU 25 determines whether the sulfur accumulated quantity of NOx trap catalyst 13 calculated at step S4 has reached to a predetermined quantity S1 (poisoning release request quantity) so as to become a regeneration timing, namely, determines whether the sulfur poisoning release request is needed or not. If the sulfur accumulated quantity is smaller than a predetermined quantity S1 (for example 1 through 2 grams), ECU 25 determines that the sulfur poisoning release is unnecessary and the routine goes to a step S14. On the other hand, if sulfur accumulated quantity is equal to or larger than predetermined quantity S1, ECU 25 determines that the sulfur poisoning release is needed and the routine goes to a step S801 of a flowchart shown in FIG. 14 in which ECU 25 sets flag rq-desul (sulfur poisoning release request flag) to "1" to output the sulfur poisoning release request. At step S14, ECU 25 determines whether NOx accumulated quantity in NOx trap catalyst 13 has reached to a predetermined quantity NOx1 (for example, 0.1 grams) (a request level of NOx release and reduction) and engine 1 becomes a timing at which NOx is released and reduced. If NOx accumulated quantity is smaller than predetermined quantity NOx1, the routine goes to a step S15. If NOx accumulated quantity is equal to or larger than predetermined quantity NOx1, ECU 25 determines that the release and reduction processes of NOx are needed and the routine goes to a step S901 in the flowchart of FIG. 15 in which a flag rq-sp is set to "1" (rq-sp flag is set to "1" to output a request of the release and reduction processes of NOx. At step S15, ECU 25 determines whether it is an acceleration time (a start acceleration) from an engine idling state, the turbo charged pressure is in a non developed state equal to or below a predetermined turbo charge pressure (for example, −50 KPa), and fuel injection quantity Q is a transient driving state equal to or larger than a predetermined quantity (for example 10 mm$^3$/st. The start acceleration is determined on the basis of engine speed Ne and accelerator opening angle or fuel injection quantity and the turbo charged pressure is determined on the basis of engine speed Ne. If engine 1 falls in a transient state drive, it is difficult for a vehicle driver to notice a change in a combustion sound along with a switching of the combustion mode to the split retard combustion and, if the turbo charge is not yet developed, the variation in the intake air quantity is smooth. The torque variation along with the change of the combustion mode is minor so that it is difficult for the vehicle driver to notice the mode switching from the ordinary combustion mode to the split retard combustion. In addition, since fuel injection quantity Q is equal to or higher than a predetermined value, a combustion stability in the split retard combustion can be assured. At step S15, ECU 25 determines that engine 1 falls in the transient driving state in which it is the time at which the start acceleration (acceleration) occurs from the idling state, the turbo charged pressure is not yet developed, and fuel injection quantity Q is equal to or higher than a predetermined quantity and the routine goes to a step S16. At step S16, ECU 25 determines whether the accumulated quantity of NOx in NOx trap catalyst 13 calculated at step S3 has reached to a predetermined quantity NOx2 (for example about 0.2 grams) (allowable level of NOx release and reduction). It is noted that predetermined quantity NOx2 (regeneration allowable level) is smaller than predetermined quantity NOx1 (regeneration request level). If NOx accumulated quantity is equal to or above predetermined quantity NOx2, namely, the NOx accumulated quantity is less than predetermined quantity NOx1 and equal to or greater than predetermined quantity NOx2, ECU 25 issues the request of release and reduction of NOx with rq-sp flag set to "1" at step S901 in the flowchart shown in FIG. 15 in the same way as step S14 at which ECU 25 determines that NOx accumulated quantity is equal to or larger than predetermined quantity NOx1.

Thereby, if NOx accumulated quantity has reached to predetermined quantity has reached to predetermined quantity NOx2 or more, a process such that an NOx trap capability at NOx trap catalyst 13 is at all times carries out during the start acceleration in which the turbo charged pressure is not yet developed below the predetermined pressure and fuel injection quantity Q is equal to or above the predetermined quantity. Hence, if the release and reduction process of NOX which is necessary to be relatively frequently repeated is at all times carried out so that the switch of the combustion mode to the split retard combustion can be made without development of the smoke and without notice of the driver so that NOx trap capability can be maintained.

Figure 7:
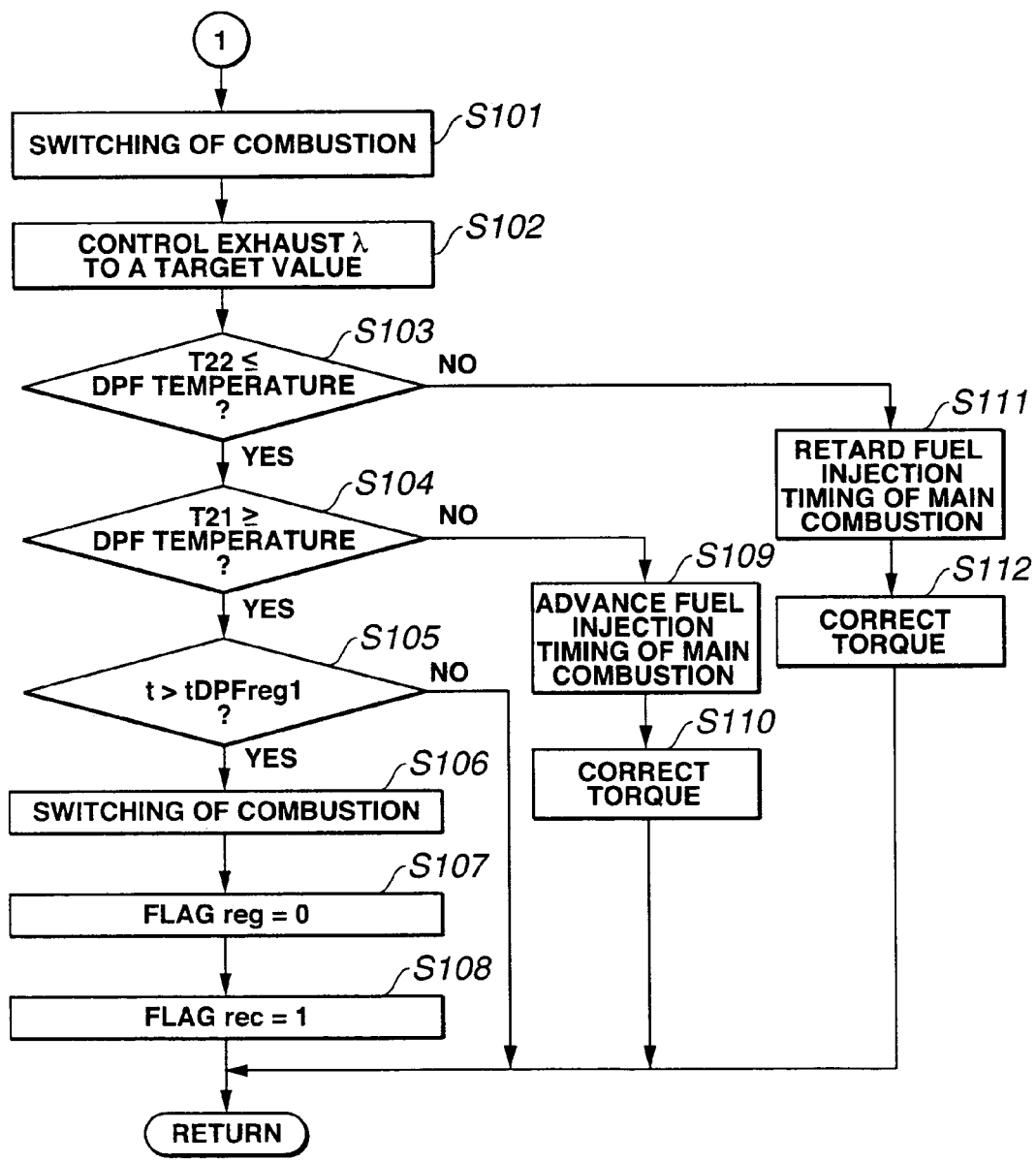
FIG. 7 is a flowchart representing a DEF regeneration process of the combustion control apparatus in the preferred embodiment shown in FIG. 1.

Hence, it is also possible to constitute the combustion control apparatus in which the switching of the combustion mode to the split retard combustion on the basis of DPF regeneration request and/or sulfur poisoning release request is carried out in the transient drive state in which the start acceleration occurs in engine 1 from the idling state, the turbo charged pressure is not developed which is equal to or below the predetermined pressure, and fuel injection quantity Q is equal to or higher than the predetermined quantity. Next, FIG. 7 shows the DPF regeneration process when flag reg is determined to be set to "1" (flag reg=1) at step S6. At step S101, ECU 25 switches the combustion mode from the ordinary lean combustion into the split retard combustion in which the preliminary combustion is carried out at least once at or near to the (upper) top dead center and the main combustion to develop the main torque to be retarded after the complete end of the preliminary combustion.

Figure 17:
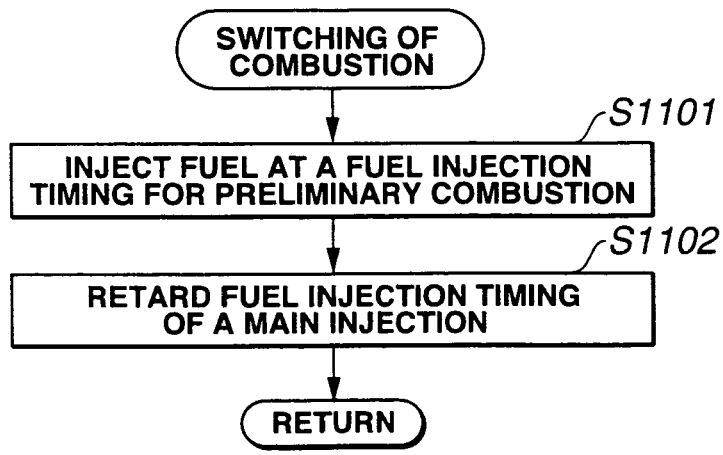
FIG. 17 is a flowchart representing a combustion mode switching control in the preferred embodiment of the combustion control apparatus shown in FIG. 1.
Figure 18:
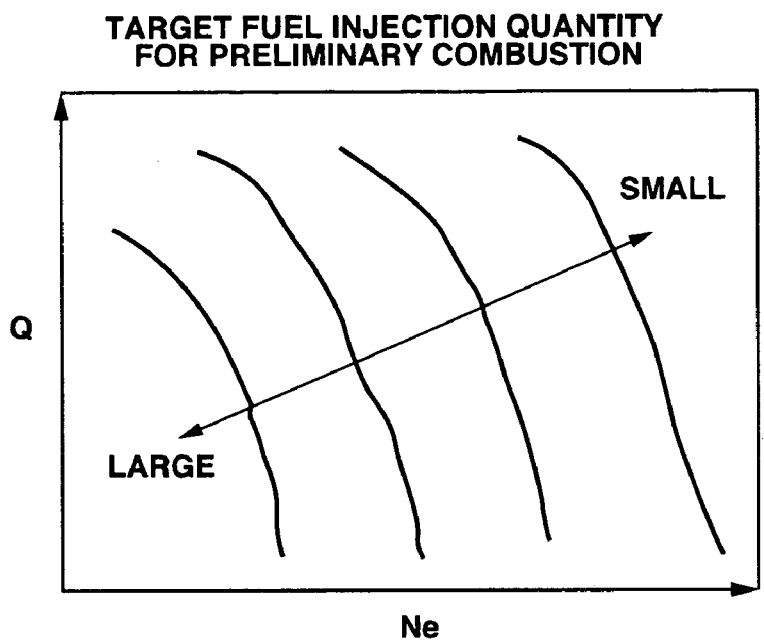
FIG. 18 is a characteristic graph representing a target injection quantity for a preliminary combustion in the split retard combustion in the preferred embodiment of the combustion control apparatus shown in FIG. 1.
Figure 19:
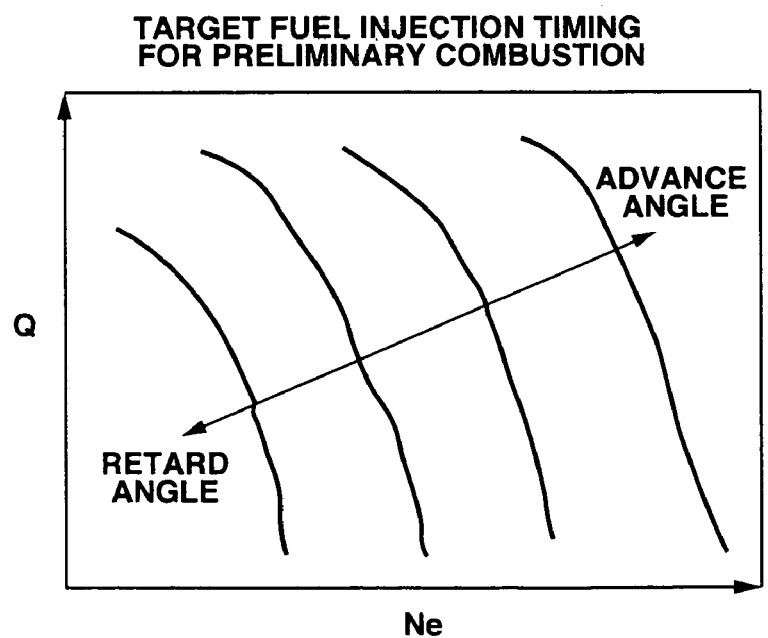
FIG. 19 is a characteristic graph representing a characteristic graph of a target injection quantity for a preliminary fuel combustion for the split retard combustion in the preferred embodiment of the combustion control apparatus according to the present invention.

If a command to switch the combustion mode is issued, the combustion mode switching as shown in the flowchart shown in FIG. 17 is carried out. It is note that, in all cases where the command to switch the combustion mode is issued, the processing shown in FIG. 17 carries out the switching of the combination. At a step S1101, as shown in FIG. 18, ECU 25 sets the fixed injection quantity for the preliminary combustion in accordance with engine speed Ne and fuel injection quantity, as shown in FIG. 19, sets the fuel injection timing for the preliminary combustion in accordance with engine speed Ne, and fuel injection quantity Q, and injects the fuel injection quantity at the ignition timing to generate the preliminary injection.

Figure 20:
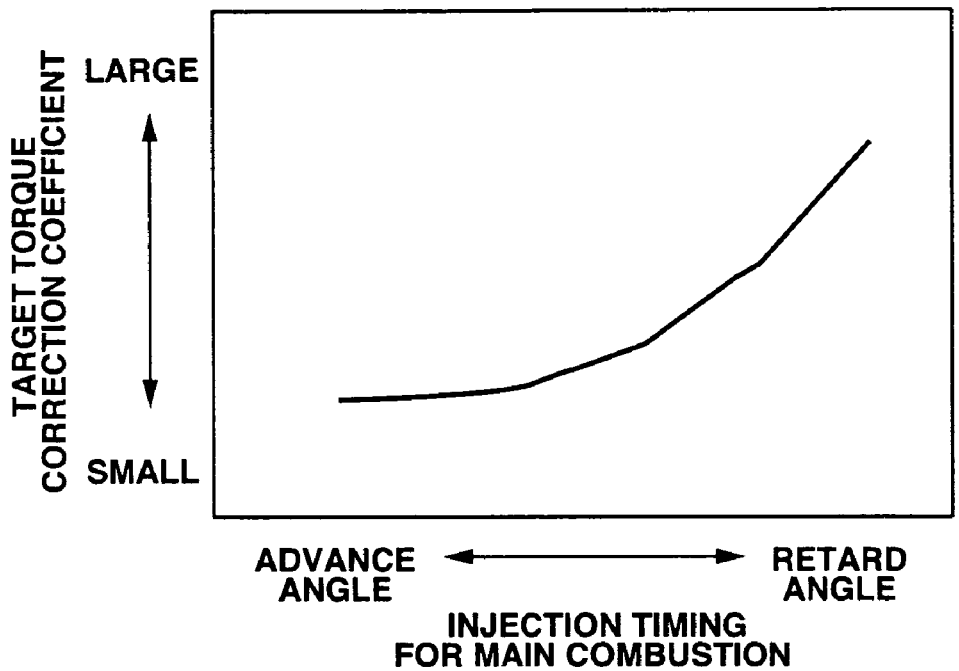
FIG. 20 is a characteristic graph representing a correlation between an injection timing for a main fuel combustion of the split retard combustion and a torque correction coefficient.
Figure 21:
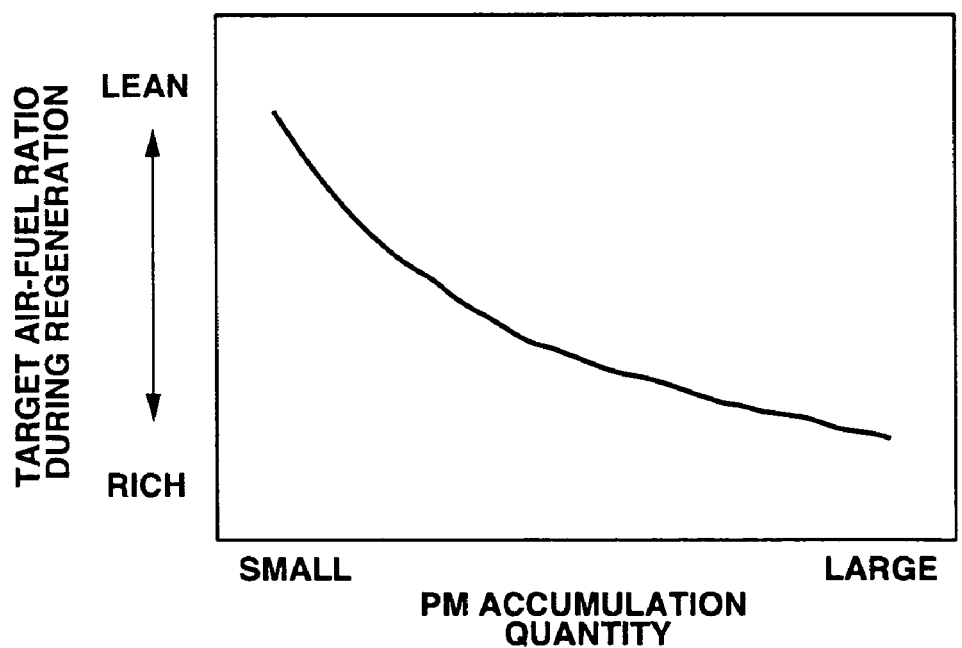
FIG. 21 is a characteristic graph representing a correlation between a minute particle PM accumulation quantity and a target air-fuel ratio during the regeneration of a DPF in the preferred embodiment of the combustion control apparatus shown in FIG. 1.
Figure 22:
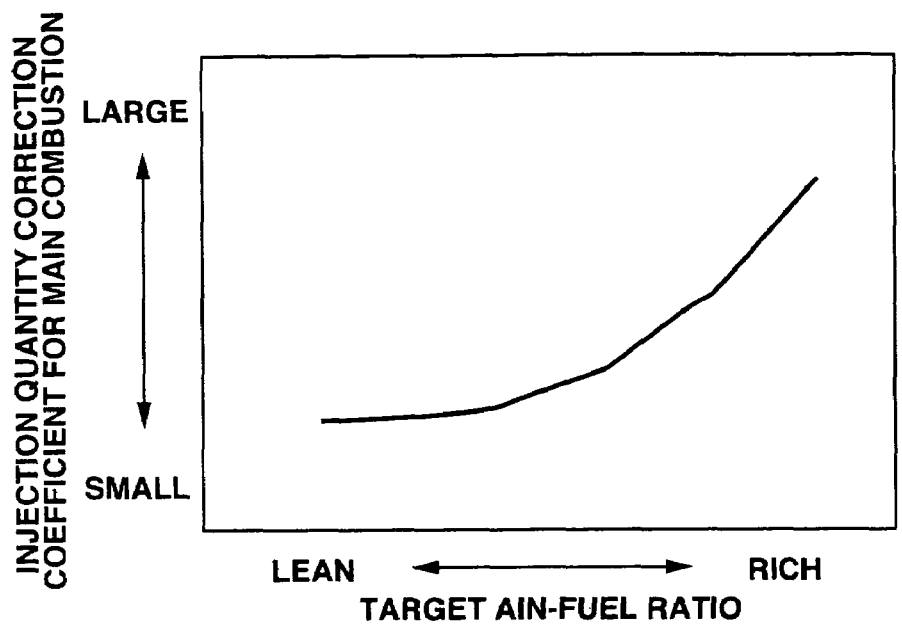
FIG. 22 is a characteristic graph representing a correlation between a target air-fuel ratio of the split retard combustion and a correction coefficient of a main combustion injection quantity in the preferred embodiment of the combustion control apparatus shown in FIG. 1.

Next, at a step S1102, as shown in FIG. 4, ECU 25 sets the injection timing for the main combustion in accordance with engine speed Ne, and fuel injection quantity Q to generally retard the ignition timing for main combustion gradually toward the fuel injection timing. It is noted that, as shown in FIG. 20, a correction coefficient to largely correct incrementally the injection quantity as the injection timing becomes largely retarded is calculated, the quantity accumulated to the ordinary fuel injection quantity being injection quantity for the main injection, the fuel being increased as the fuel injection timing for the main combustion becomes retarded so that a torque equal to the ordinary combustion mode can be obtained. At a step S102, as shown in FIG. 21, ECU 25 sets a target air-fuel ratio during the regeneration of DPF 14 in accordance with PM accumulated quantity. The target air-fuel ratio is set to be rich as PM accumulated so as to prevent a large quantity of minute particulates from being abruptly oxidized. The air-fuel ratio is controlled to become the target air-fuel ratio through an adjustment of a fresh air quantity through intake throttle valve 6 and/or exhaust gas recirculation control valve 19. It is noted that, in a case where the target air-fuel ratio becomes small and reaches approximately to the stoichiometric air-fuel ratio, a pumping loss due to an intake air throttling occurs. Hence, ECU 25 corrects the fuel injection quantity by a correction coefficient in accordance with the target air-fuel ratio as shown in FIG. 22. At a step S103 shown in FIG. 7, ECU 25 determines whether the temperature of DPF 14 is equal to or higher than target lower limit value T22 (Yes), the routine goes to a step S104. If the temperature of DPF 14 is lower than target lower limit value T22 (No), the routine goes to a step S111. At step S111, ECU 25 retards the fuel injection timing for the main combustion in order to raise the temperature of DPF equal to or higher than target lower limit value T22. At the next step S112, ECU 25 carries out a torque correction (incremental correction of the fuel injection quantity for the main combustion) in order to compensate for a torque drop due to the retardation of the fuel injection timing. At a step S104, ECU 25 determines whether the temperature of DPF 14 is equal to or lower than a target upper limit value T21. If the temperature of DPF 14 is equal to or lower than target upper limit value T21, the routine goes to a step S105. If the temperature of DPF 14 is in excess of target upper limit value T21, the routine goes to a step S109 at which ECU 25 advances the fuel injection timing for the main combustion so as to make the temperature of DPF 14 equal to or lower than target upper limit value T21 while the exhaust gas temperature is reduced. At step S105, ECU 25 determines whether a time t for which the exhaust gas air-fuel ratio is controlled to become the target value has passed a reference time tDPFreg1. If ECU 25 determines that the time t has passed reference time tDPFreg1 (Yes), ECU 25 determines that the DPF regeneration has ended and the routine goes to a step S106. At step S106, ECU 25 switches the drive according to the split retard combustion to the drive according to the ordinary combustion to stop the heat of DPF 14 so that the target air-fuel ratio to a normal value. At step S107, ECU 25 resets flag reg to "0" (flag reg=0). At a step S108, ECU 25 sets a flag rec of a melting down prevention mode to "1" and prevents DPF 14 from being melt down due to a sudden burn of minute particulate matters PM not burnt at DPF 14. On the other hand, if ECU 25 determines that time T has not pass reference time tDPFreg1, this routine is ended bypassing steps S106 through step S108 in order to continue the regeneration of DPF 14.

Figure 8:
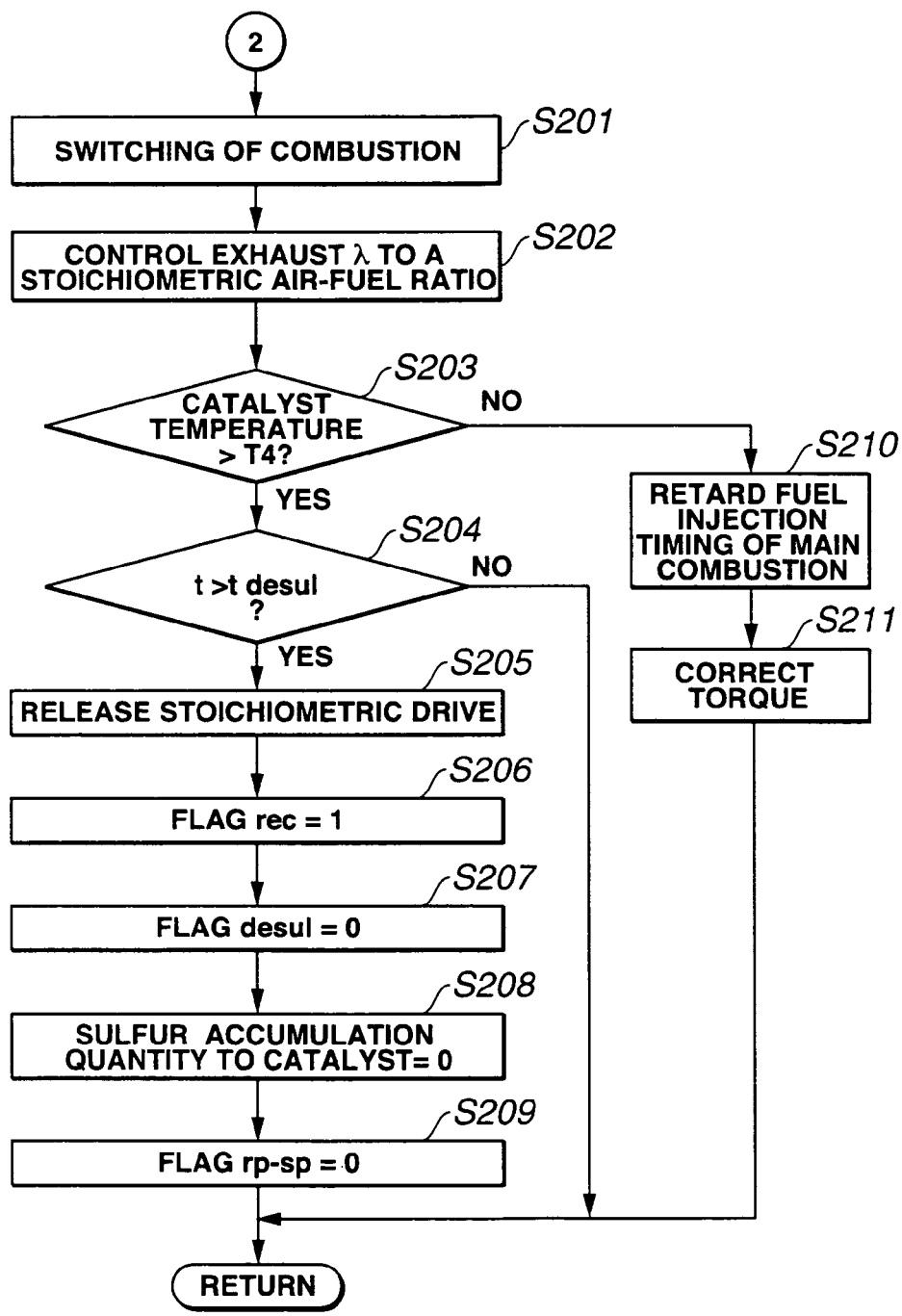
FIG. 8 a flowchart representing a sulfur poisoning release process of the combustion control apparatus in the preferred embodiment shown in FIG. 1.

Next, a sulfur poisoning release process when ECU 25 determines that flag desul=1 at step S7 will be described in details below with reference to a flowchart shown in FIG. 8. At a step S201, ECU 25 switches the combustion mode to the split retard combustion on the basis of the fact that the sulfur poisoning release request has been issued. At a step S202, ECU 25 controls the air-fuel mixture ratio for the sulfur poisoning release to the stoichiometric air-fuel ratio. The control over the air-fuel ratio is carried out by adjusting a fresh air quantity through intake air valve 6 and exhaust gas recirculation control valve 19 in the same way as the regeneration of DPF 14. At a step S203, ECU 25 determines whether the temperature of NOx trap catalyst 13 is higher than a predetermined temperature T4. For example, in a case where, as NOx trap catalyst 13, Ba series NOx trap catalyst is used, it is necessary to increase the temperature of NOx trap catalyst 13 higher than 600° C. under the rich to stoichiometric atmosphere. Thus, predetermined temperature T4 is set to 600° C. or higher.

If the catalyst temperature is higher than predetermined temperature T4 (Yes) at step S203, the routine goes to a step S204. If the catalyst temperature is equal to or lower than predetermined temperature T4, the routine goes to a step S210. When the routine goes to step S210, the same process as steps S111 and S112 as the flowchart shown in FIG. 7 is carried out. That is to say, at step S210, ECU 25 raises the exhaust gas temperature with the fuel injection timing of the main combustion retarded since the temperature at NOx trap catalyst 13 is equal to or below predetermined temperature T4. At step S211, ECU 25 compensates the decrease of torque due to the retardation for the increase quantity of the injection quantity for the main combustion. At a step S204, ECU 25 determines whether the stoichiometric air-fuel ratio and sulfur poisoning release at a high exhaust gas temperature are carried out for predetermined time of idesul, namely, whether the sulfur poisoning release has been completed.

If time t for the sulfur poisoning release process is in excess of a predetermined time idesul, the routine goes to a step S205. If time t of the sulfur poisoning release process is equal to or shorter than predetermined time tdesul, this routine is ended by bypassing steps S205 through S209 in order to continue the sulfur poisoning release process. At step S205, since the sulfur poisoning release is ended, the stoichiometric air-fuel ratio drive by means of the split retard combustion is released and the combustion mode is returned to the ordinary combustion. At step S206, ECU 25 sets a flag rec to "1" in order to execute a melting down preventing mode. Thus, the melting down of DPF 14 due to the stepwise burning of PM at DPF 14 with the abrupt lean of the exhaust gas air-fuel ratio can be prevented. At step S207, flag desul is zeroed (flag desul=0). At step S208, a sulfur accumulated quantity of NOx trap catalyst 13 is reset to zero. At step S209, flag rq-sp is zeroed which is a request flag for the rich spike. This is because the sulfur poisoning release is carried out so that NOx trap catalyst 13 is exposed to the stoichiometric air-fuel ratio for a long period of time and, at the same time, the release and reduction process for NOx are carried out.

Figure 9:
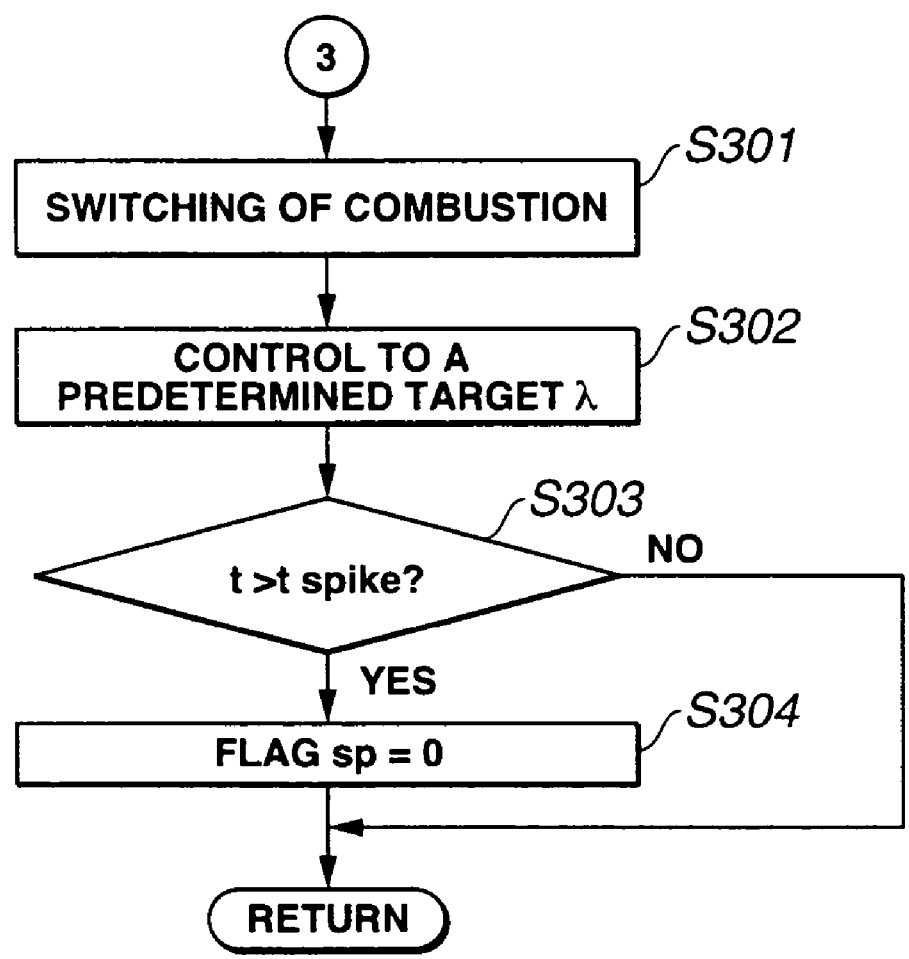
FIG. 9 is a flowchart representing a rich spike process of the combustion control apparatus in the preferred embodiment shown in FIG. 1.
Figure 23:
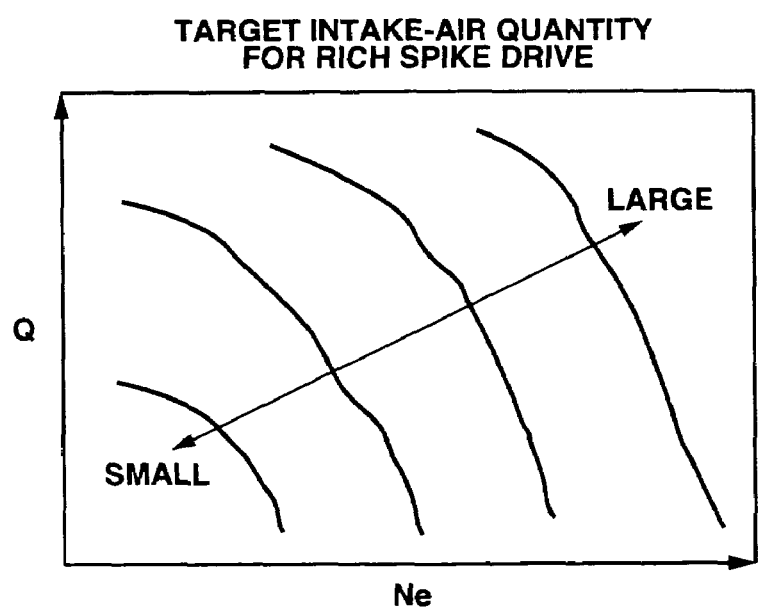
FIG. 23 is a characteristic graph representing a characteristic of a target intake air quantity in the rich spike control in the preferred embodiment of the combustion control apparatus shown in FIG. 1.

Next, the rich spike mode (release and reduction process of NOx) will be described below with reference to a flowchart shown in FIG. 9. At a step S301, ECU 25 carries out the mode switching from the ordinary combustion to the split retard combustion. At a step S302, ECU 25 controls the air-fuel ratio to a predetermined target air-fuel ratio (rich air-fuel ratio) to perform the rich spike. It is noted that the target air-fuel ratio is achieved by adjusting the intake air quantity to the target intake air quantity shown in FIG. 23. Thus, with the atmosphere of NOx trap catalyst 13 temporarily enriched (reduction atmosphere), NOx trapped within NOx trap catalyst 13 is released and reduced. At a step S303, ECU 25 determines whether time t for which the rich spike control is carried out is in excess of a predetermined time tspike. If rich spike control time t is in excess of predetermined time tspike, the routine goes to a step S304. At step S304, ECU 25 resets flag sp representing the rich spike mode to "0". If rich spike control time t is not in excess of predetermined time tspike, the present routine is ended by bypassing step S304 in order to continue the rich spike control.

Figure 10:
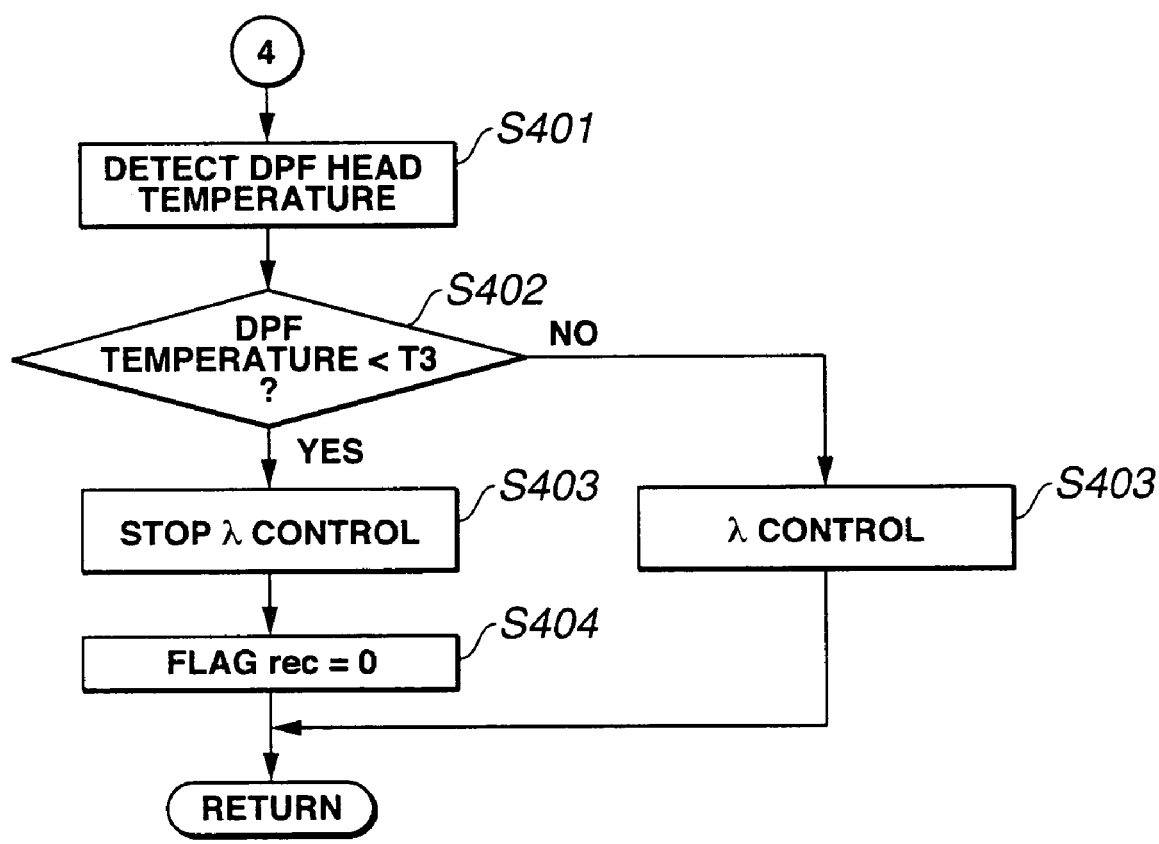
FIG. 10 is a flowchart representing a melting down preventing mode of the combustion control apparatus in the preferred embodiment shown in FIG. 1.

Next, the melting down preventing mode will be described with reference to a flowchart shown in FIG. 10. At a step S401, ECU 25 detects the temperature of DPF 14. At a step S402, ECU 25 determines whether the temperature of DPF 14 is lower than a predetermined temperature T3 so as to determine whether the temperature of DPF 14 falls within a temperature region in which an abrupt oxidization of PM is not started.

If temperature of DPF 14 is equal to or higher than a predetermined temperature T3, the routine goes to a step S405. At step S405, since it is necessary to reduce the temperature of DPF 14 lower than predetermined temperature T3 while the exhaust gas temperature is reduced, the air-fuel ratio is controlled to be equal to or smaller than a predetermined value by the control over intake air throttle valve 6 and/or exhaust gas recirculation control valve 19. On the other hand, if the temperature of DPF 14 is lower than predetermined temperature T3, a measure of preventing the melting-down is not needed and the routine goes to a step S403. At step S403, ECU 25 stops the air-fuel ratio control at step S405. At the next step S404, flag rec is reset to "0".

Figure 11:
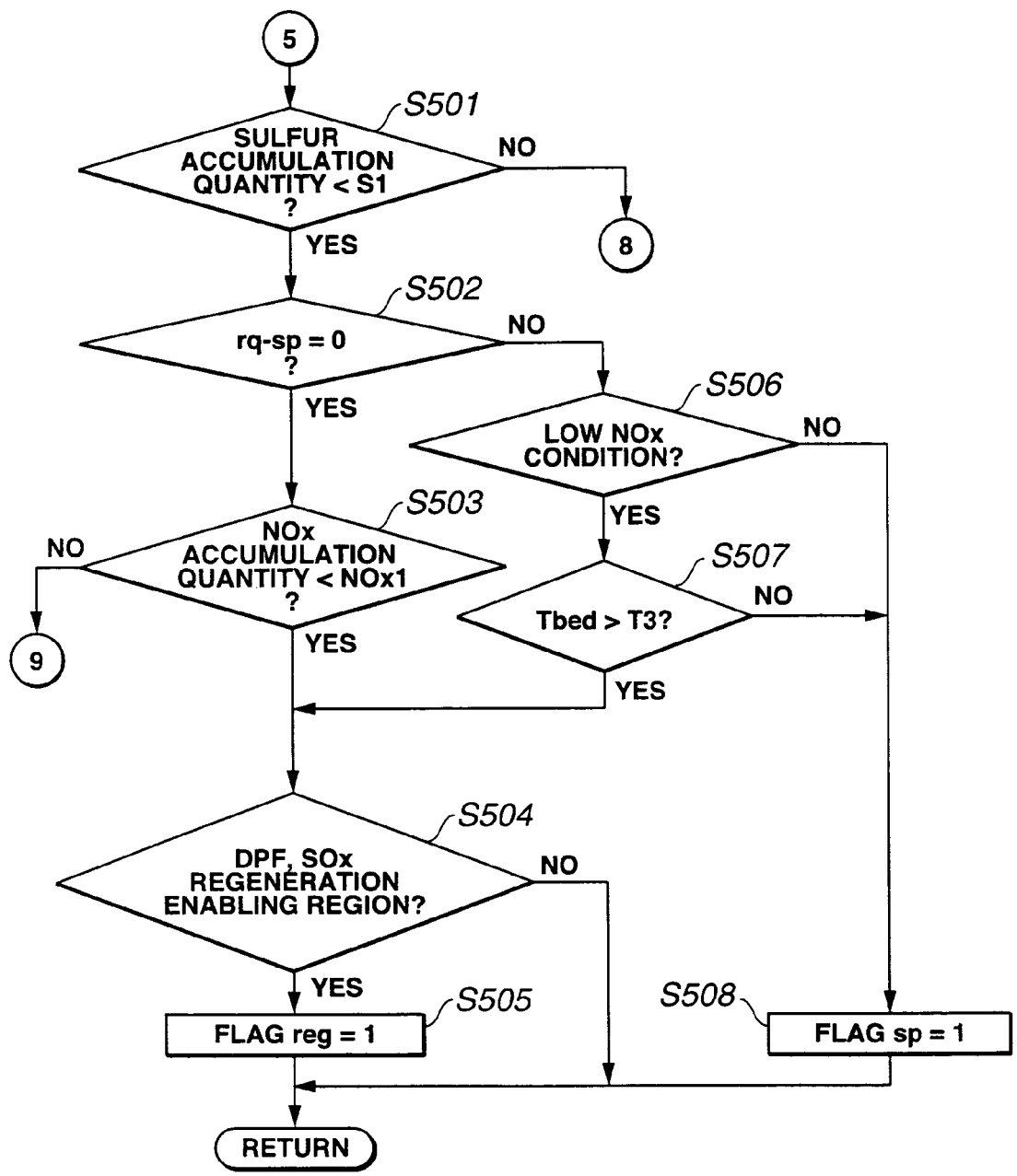
FIG. 11 is a flowchart representing a determination of the regeneration process during a DPF regeneration process in the preferred embodiment of the combustion control apparatus shown in FIG. 1.

Next, a process at the time of DPF regeneration process will be described with reference to the flowchart of FIG. 11. At a step S501, ECU 25 determines whether the sulfur accumulated quantity at NOx trap catalyst 13 is smaller than a predetermined quantity S1 required for the sulfur poisoning release. If the sulfur poisoning release. If the sulfur accumulated quantity is lower than predetermined quantity S1, the routine goes to a step S502. If the sulfur accumulated quantity is equal to or lower than predetermined quantity S1, the routine goes to a step S801 shown in FIG. 14 at which 1 is set to flag rq-desul (a sulfur poisoning release request flag). At a step S502, ECU 25 determines whether the rich spike request is present or not (request for the release and the reduction of NOx) on the basis of a status of a flag rq-sp. If flag rq-sp is zeroed and no rich spike request (request for the reduction and release of NOx) is issued, the routine goes to a step S503. If flag rq-sp is set to "1" and there is a rich spike request (NOx release and reduction process request), the routine goes to a step S506. At step S503, ECU 25 determines whether the NOx accumulated quantity at NOx trap catalyst is lower than a predetermined quantity NOx1 required for the rich spike (release and reduction of NOx). If NOx accumulated quantity is lower than predetermined quantity NOx1, the routine goes to a step S504. If NOx accumulated quantity is equal to or larger than a predetermined quantity NOx1, the routine goes to step S901 shown in FIG. 15 at which flag rq-sp is set to 1. At step S504, ECU 25 determines whether the present driving condition falls within corresponds to a driving region in which regeneration of DPF and the sulfur poisoning release according to the split retard combustion is possible If the present engine speed Ne and engine load fall in the region in which the DPF regeneration and the sulfur poisoning release are possible, the routine goes to a step S505. At step S505, ECU 25 sets 1 to flag reg so that the processing of the DPF regeneration mode is carried out. If the present engine speed Ne and engine load doe not correspond to the DPE regeneration and sulfur poisoning release enable region, the regeneration of DPF 14 cannot be carried out and the present routine is ended by bypassing a step S505. In addition, if the routine goes from a step S502 to a step S506, namely, both of the regeneration request of DPF and the request of release and reduction of NOx are issued, ECU 25 determines whether the present driving condition is a driving condition (for example, a steady-state drive condition) in which NOx exhaust gas quantity is small. If the driving condition is such that NOx exhaust gas quantity is large, the routine goes to a step S508 at which a flag sp is set to "1" so that the release and reduction process for NOx (rich spike process) has a higher priority than the DPF regeneration On the other hand, in a case where ECU 25 determines that the present driving condition is such that the NOx exhaust gas quantity is small, the routine goes to a step S507. At step S507, ECU 25 determines whether a bed temperature Tbed of DPF 14 is higher than a predetermined temperature T3. If ECU 25 determines that bed temperature Tbed of DPF 14 is higher than predetermined temperature T3, the routine goes to a step S504. If the driving condition corresponds to the DPF regeneration enable region, 1 is set to flag reg. If bed temperature Tbed of DPF 14 is equal to or lower than predetermined temperature T3, the routine goes to a step S504. If the driving condition corresponds to DPF regeneration enable region, 1 is set to flag reg at a step S508. If bed temperature Tbed of DPF 14 is equal to or lower than predetermined temperature T3, a high priority is given to the release and reduction process of NOx since it takes a lot of time for bed temperature Tbed to reach to a regeneration enabling temperature even if the temperature rise is started.

Figure 12:
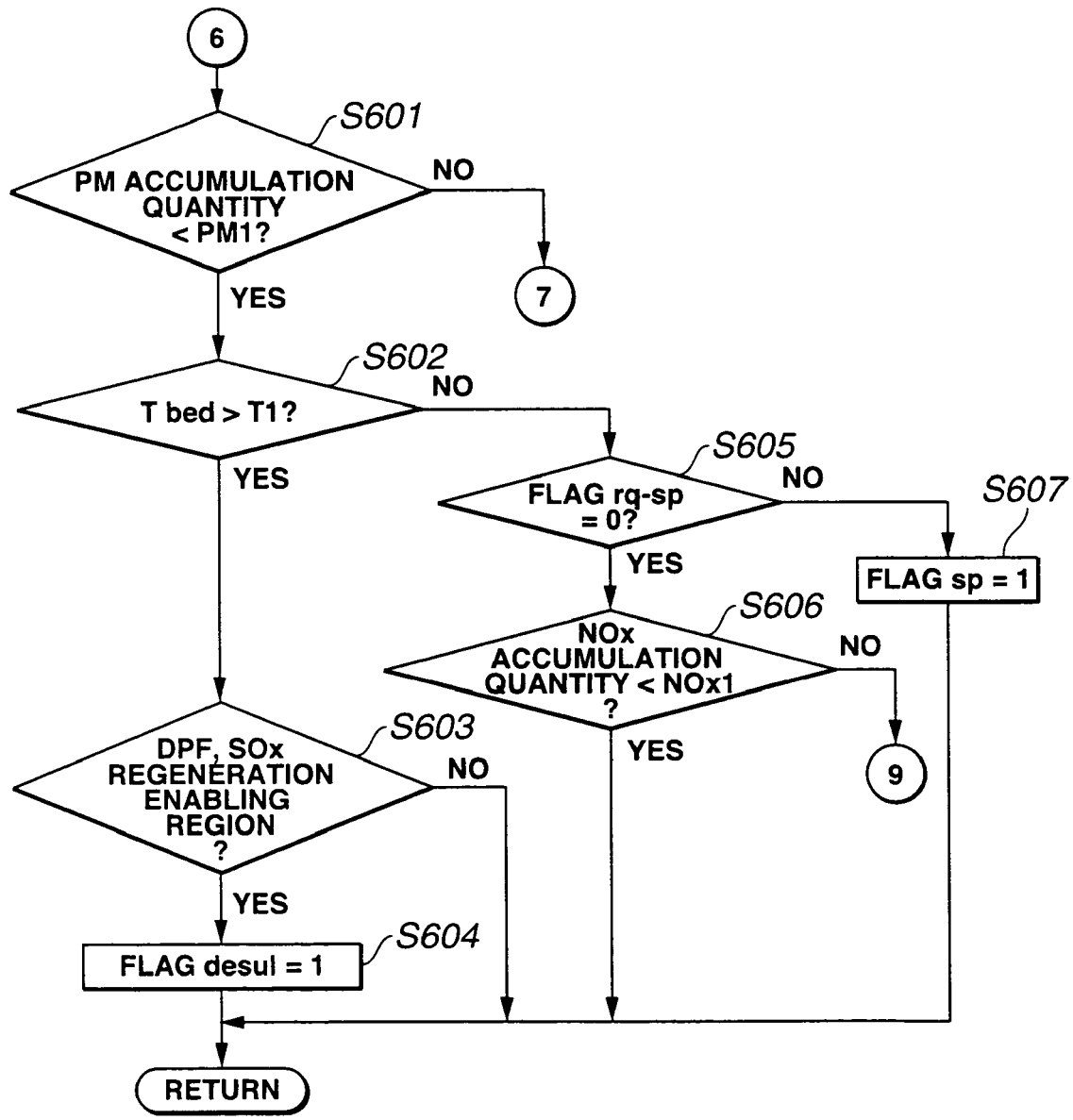
FIG. 12 is a flowchart representing a determination of the regeneration process during a sulfur poisoning release request in the preferred embodiment of the combustion control apparatus in the preferred embodiment of the combustion control apparatus shown in FIG. 1.
Figure 13:
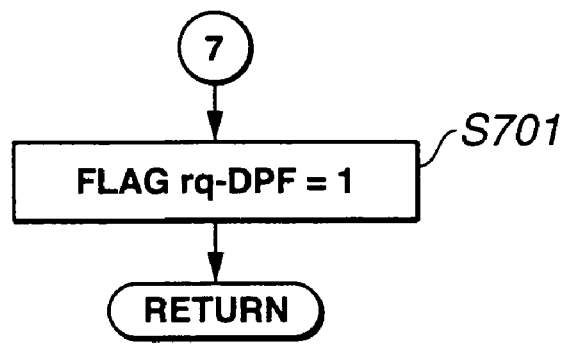
FIG. 13 is a flowchart representing a setting of a DPF regeneration request in the preferred embodiment of the combustion control apparatus shown in FIG. 1.
Figure 14:
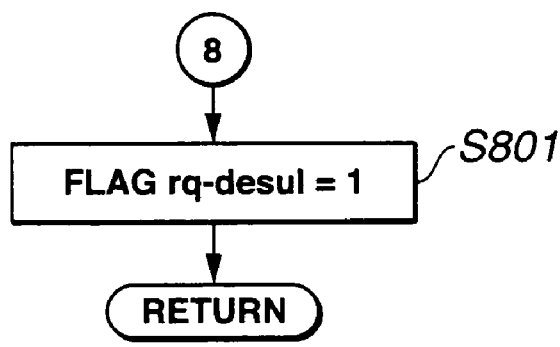
FIG. 14 is a flowchart representing a setting of a rich spike request in the preferred embodiment of the combustion control apparatus shown in FIG. 1.
Figure 15:
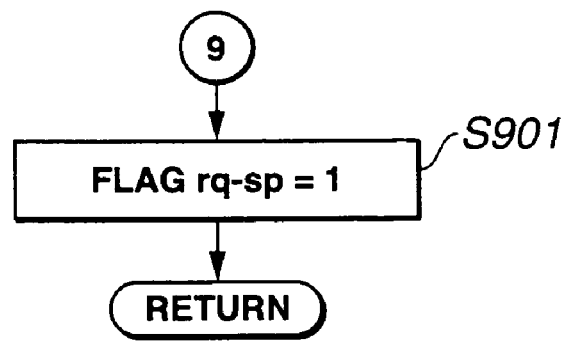
FIG. 15 is a flowchart representing a setting of a rich spike request in the preferred embodiment of the combustion control apparatus shown in FIG. 1.

Next, the process of sulfur poisoning release request will be described with reference to a flowchart shown in FIG. 12. At a step S601, ECU 25 determines whether a quantity of minute particles PM accumulated into DPF 14 is less than a predetermined quantity PM1. If PM accumulated quantity is less than predetermined quantity PM1, the routine goes to a step S602. On the other hand, if PM accumulated quantity is equal to or higher than a predetermined quantity PM1, the routine goes to a step S701 shown in FIG. 13 at which flag rq-DPF is set to "1" (rq-DPF=1). At a step S602, ECU 25 determines whether bed temperature Tbed of NOx trap catalyst is higher than predetermined temperature T1. It is noted that predetermined temperature T1 is a bed temperature of NOx trap catalyst appropriate for the sulfur poisoning release. If bed temperature Tbed of NOx trap catalyst is higher than a predetermined temperature T1, the routine goes to a step S603. At step S603, ECU 25 determines whether the present driving condition corresponds to DPF regeneration and the sulfur poisoning release enable region due to the split retard combustion according to the split retard combustion. If the present driving condition falls within the regeneration enable region, the routine goes to a step S604. At step S604, flag desul is set to "1" and the sulfur poisoning release is enabled to be carried out. On the other hand, if the present driving condition does not correspond to the DPF regeneration and the sulfur poisoning release enable region, the present routine is ended by bypassing step S604. If bed temperature of NOx trap catalyst 13 is lower than predetermined temperature T1, the routine goes to a step S605. At step S605, ECU 25 determines the presence or absence of the rich spike request (NOx release and reduction request) on the basis of flag status of flag rq-sp. If there is no rich spike request (rq-sp=0), the routine goes to a step S606. At step S606, ECU 25 determines whether the NOx accumulated quantity is smaller than predetermined quantity NOx1 requiring the release and reduction process for NOx. If ECU 25 determines that NOx accumulated quantity is smaller than predetermined quantity NOx1, the routine is directly ended. If NOx accumulated quantity is equal to or larger than predetermined quantity NOx1, the routine goes to step S901 shown in FIG. 15 at which flag rq-sp is set to "1" and NOx release and reduction process request (rich spike process request) is developed. On the other hand, if the rich spike request is present at step S605 (rq-sp=1), the routine goes to a step S607 at which flag sp is set to "1" (sp=1) to have the release and reduction process of NOx carried out.

Figure 16:
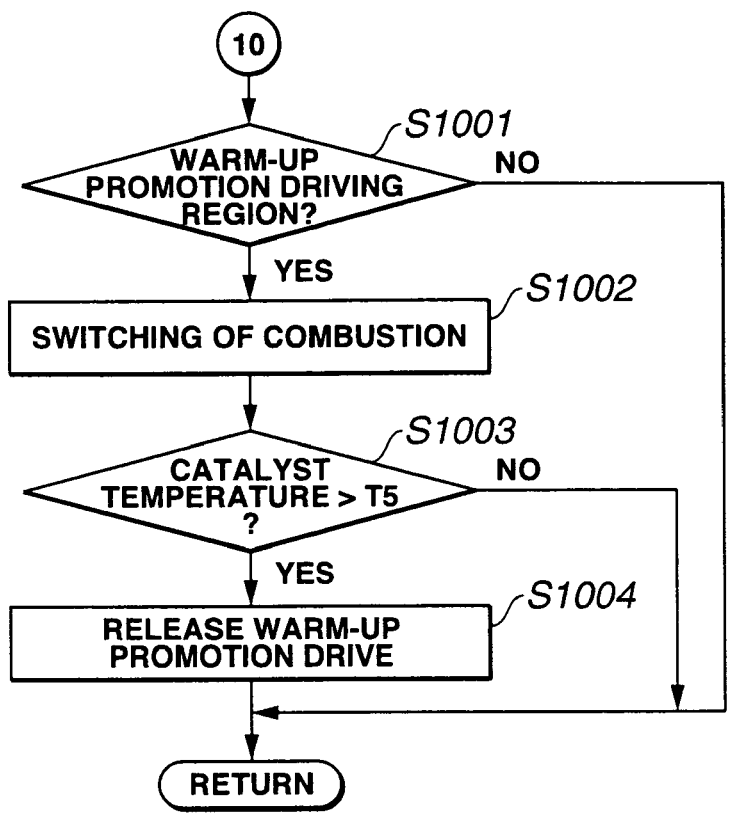
FIG. 16 is a flowchart representing a promotion control of an activation of NOx trap catalyst in the preferred embodiment of the combustion control apparatus shown in FIG. 1.

Next, FIG. 16 shows a flowchart representing a process of an earlier activation of NOx trap catalyst 13 utilizing the split retard combustion. At a step S1001, ECU 25 determines whether such a drive as to promote an warm up of NOx trap catalyst 13 is possible. In other words, since the warm-up promotion is carried out for NOx trap catalyst 13 by means of the split retard combustion, at step S1001, ECU 25 determines whether the present driving condition is the driving condition in which the drive according to the split retard combustion is possible. If the present driving condition is the condition in which the warm-up promotion of NOx trap catalyst 13 by means of the drive according to the split retard drive can be carried out, the routine goes to a step S1002. At step S1002, ECU 25 switches the combustion mode from the ordinary combustion mode to the split retard combustion.

In the split retard combustion, the timing at which the main combustion occurs can largely be retarded. Thus, a rise in the exhaust gas temperature can be carried out so that the warm-up of NOx trap catalyst 13 can be promoted. At a step S1003, ECU 25 determines whether the temperature of NOx trap catalyst is higher than a predetermined activation temperature T5. If the temperature of NOx trap catalyst is higher than activation temperature T5, the routine goes to a step S1004 at which the combustion mode is returned from the split retard combustion to the ordinary combustion mode. Such a process that the warm-up of NOx trap catalyst 13 is promoted is released.

The entire contents of a Japanese Patent Application No. 2003-279630 (filed in Japan on Jul. 25, 2003) are herein incorporated by reference. The scope of the invention is defined with reference to the following claims.

What is claimed is:

1. A combustion control method for an internal combustion engine, the engine comprising an exhaust gas purifying section disposed in an exhaust system of the engine, the method comprising:
   determining, on the basis of a state of the exhaust gas purifying section, whether a request is issued to switch a combustion mode of the engine to a predetermined fuel combustion mode in which a preliminary fuel combustion is carried out at a compression stroke top dead center so as to increase an in-cylinder temperature at the compression stroke top dead center and a main fuel combustion to develop a main engine torque is started after (i) a complete end of the preliminary fuel combustion and (ii) a period of time after the complete end of the preliminary fuel combustion; and
   switching the combustion mode of the engine to the predetermined fuel combustion mode when determining that the request to switch the combustion mode to the predetermined fuel combustion mode is issued and during a transient driving state of the engine.

2. A combustion control method for an internal combustion engine as claimed in claim 1, wherein switching the combustion mode of the engine to the predetermined fuel combustion mode further comprises switching from a first mode which includes preliminary fuel combustion that does not occur at or near to top dead center and a subsequent main fuel combustion to the predetermined fuel combustion mode.

3. A combustion control method for an internal combustion engine as claimed in claim 1, wherein a main combustion injection resulting in the main fuel combustion to develop the main engine torque is started after (i) the complete end of the preliminary fuel combustion and (ii) another period of time after the complete end of the preliminary fuel combustion.

4. A combustion control method for an internal combustion engine as claimed in claim 1, the main fuel combustion providing a combustion mainly composed of a pre-mixture combustion.

5. A combustion control apparatus for an internal combustion engine, comprising:
  an exhaust as purifying section disposed in an exhaust system of the engine;
  a combustion mode switching request determining section that determines, on the basis of a state of the exhaust gas purifying section, whether a request is issued to switch a combustion mode of the engine to a predetermined fuel combustion mode in which a preliminary fuel combustion is carried out at a compression stroke top dead center so as to increase an in-cylinder temperature at the compression stroke top dead center and a main fuel combustion to develop a main engine torque is started after (i) a complete end of the preliminary fuel combustion and (ii) a period of time after the complete end of the preliminary fuel combustion; and
  a combustion mode switching section that switches the combustion mode of the engine to the predetermined fuel combustion mode when the combustion mode switching request determining section determines that the request is issued and during a transient driving state of the engine.

6. A combustion control apparatus for an internal combustion engine as claimed in claim 5, wherein the transient driving state of the engine includes a state of the engine during a vehicular start acceleration.

7. A combustion control apparatus for an internal combustion engine as claimed in claim 5, wherein the internal combustion engine includes a turbo charger, and wherein the combustion mode switching section switches the combustion mode to the predetermined fuel combustion mode during the transient driving state in which a turbo charge pressure is equal to or lower than a predetermined pressure.

8. A combustion control apparatus for an internal combustion engine as claimed in claim 5, wherein the combustion mode switching section switches the combustion mode to the predetermined fuel combustion mode during the transient driving state in which a fuel injection quantity is equal to or more than a predetermined quantity.

9. A combustion control apparatus for an internal combustion engine as claimed in claim 5, wherein the internal combustion engine includes a turbo charger and the combustion mode switching section switches the combustion mode to the predetermined fuel combustion mode during the transient driving state in which a turbo charge pressure is equal to or lower than a predetermined pressure and a fuel injection quantity is equal to or more than a predetermined quantity.

10. A combustion control apparatus for an internal combustion engine as claimed in claim 5, wherein the exhaust gas purifying section comprises an NOx trap catalyst to trap NOx in exhaust gas under a lean atmosphere and the combustion mode switching request determining section determines whether the request to switch the combustion mode to the predetermined fuel combustion mode is issued on the basis of an NOx accumulated quantity in the NOx trap catalyst, and wherein an exhaust gas air-fuel ratio in the predetermined fuel combustion mode is enriched to a rich air-fuel ratio to release and reduce NOx trapped in the NOx trap catalyst.

11. A combustion control apparatus for an internal combustion engine as claimed in claim 5, wherein a fuel injection quantity for the preliminary fuel combustion is controlled in such a manner that an in-cylinder temperature during a fuel injection for the main fuel combustion is in excess of a self-ignitable temperature.

12. A combustion control apparatus for an internal combustion engine as claimed in claim 5, wherein an interval between a timing at which a combustion of the preliminary fuel combustion is started and a timing at which a combustion of the main fuel combustion is started is controlled to be equal to or wider than 20° in a crank angle.

13. A combustion control apparatus for an internal combustion engine as claimed in claim 5, wherein a timing at which the main fuel combustion is ended is controlled to 5° or thereafter in a crank angle from a compression stroke top dead center.

14. A combustion control apparatus for an internal combustion engine as claimed in claim 5, wherein the engine is adapted to carry out a first operation mode which includes preliminary fuel combustion that does not occur at top dead center and a subsequent main fuel combustion, and wherein the combustion mode switching section is adapted to move the preliminary fuel combustion to at top dead center when in the predetermined fuel combustion mode.

15. A combustion control apparatus for an internal combustion engine as claimed in claim 5, wherein a main combustion injection resulting in the main fuel combustion to develop the main engine torque is started after (i) the complete end of the preliminary fuel combustion and (ii) another period of time after the complete end of the preliminary fuel combustion.

16. A combustion control apparatus for an internal combustion engine as claimed in claim 5, wherein the main fuel combustion provides a combustion mainly composed of a pre-mixture combustion.

17. A combustion control apparatus for an internal combustion engine as claimed in claim 5, wherein the combustion mode switching request determining section determines whether the request is issued to switch the combustion mode to the predetermined fuel combustion mode in accordance with a quantity of an accumulated matter in the exhaust gas purifying section.

18. A combustion control apparatus for an internal combustion engine as claimed in claim 17, wherein the exhaust gas purifying section comprises a DPF and an NOx trap catalyst, and wherein the combustion mode switching request determining section comprises:
  a DPF regeneration request determining section that determines whether a request to carry out a DPF regeneration request is issued depending on whether an accumulation quantity of PM in the DPF has reached to a predetermined quantity of PM (PM1);
  an NOx trap catalyst sulfur poisoning release request determining section that determines whether a request to carry out a release for a sulfur poisoning of the NOx trap catalyst is issued depending on whether a sulfur accumulation quantity in the NOx trap catalyst has reached to a predetermined quantity of SOx (S1); and
  an NOx trap catalyst release and reduction process request determining section that determines whether a request to carry out the NOx release and reduction process for the NOx trap catalyst depending on whether the accumulated quantity of NOx in the NOx trap catalyst has reached to a first predetermined quantity of NOx (NOx1).

19. A combustion control apparatus for an internal combustion engine as claimed in claim 5, wherein the combustion control apparatus further comprises:

a fuel injection valve that directly injects a fuel within a combustion chamber of each cylinder of the engine;

a first detector to detect the transient driving state of the engine;

a second detector to detect the state of the exhaust gas purifying section; and an engine control unit that outputs a control signal to the fuel injection valve on the basis of the detected transient driving state of the engine and the detected state of the exhaust gas purifying section, the engine control unit comprising the combustion mode switching request determining section and the combustion mode switching section.

20. A combustion control apparatus for an internal combustion engine as claimed in claim 19, wherein the engine control unit is configured to set a fuel injection timing of preliminary fuel injection in a range of 40 through 10 degrees in crank angle before top dead center in a compression stroke of the engine.

21. A combustion control apparatus for an internal combustion engine as claimed in claim 19, wherein the engine control unit is configured to space a preliminary fuel injection and a main fuel injection by a spacing in a range of 10 through 30 degrees in crank angle.

22. A combustion control apparatus for an internal combustion engine as claimed in claim 19, wherein the engine control unit is configured to set a fuel injection timing in a range of 10 through −20 degrees before top dead center in compression stroke.

23. A combustion control apparatus for an internal combustion engine, comprising:

an exhaust gas purifying section disposed in an exhaust system of the engine;

a combustion mode switching request determining section that determines, on the basis of a state of the exhaust gas purifying section, whether a request is issued to switch a combustion mode of the engine to a predetermined fuel combustion mode in which a preliminary fuel combustion is carried out at least once at or near to a top dead center and a main fuel combustion to develop a main engine torque is started after a complete end of the preliminary fuel combustion; and a combustion mode switching section that switches the combustion mode of the engine to the predetermined fuel combustion mode when the combustion mode switching request determining section determines that the request is issued and during a transient driving state of the engine, wherein the combustion mode switching request determining section determines whether the request is issued to switch the combustion mode to the predetermined fuel combustion mode in accordance with a quantity of an accumulated matter in the exhaust gas purifying section, wherein the exhaust gas purifying section comprises a DPF and an NOx trap catalyst, and wherein the combustion mode switching request determining section comprises:

a DPF regeneration request determining section that determines whether a request to carry out a DPF regeneration request is issued depending on whether an accumulation quantity of PM in the DPF has reached to a predetermined quantity of PM (PM1);

an NOx trap catalyst sulfur poisoning release request determining section that determines whether a request to carry out a release for a sulfur poisoning of the NOx trap catalyst is issued depending on whether a sulfur accumulation quantity in the NOx trap catalyst has reached to a predetermined quantity of SOx (S1); and an NOx trap catalyst release and reduction process request determining section that determines whether a request to carry out the NOx release and reduction process for the NOx trap catalyst depending on whether the accumulated quantity of NOx in the NOx trap catalyst has reached to a first predetermined quantity of NOx (NOx1), and wherein a turbo charger is equipped in the engine, and wherein the combustion mode switching request determining section further comprises another NOx trap catalyst release and reduction process determining section that determines whether the request to carry out the NOx catalyst release and reduction process is issued depending on whether the quantity of NOx in the NOx trap catalyst is smaller than the first predetermined quantity but is equal to or larger than a second predetermined quantity of NOx (NOx2) when the engine driving condition falls in the transient driving state in which a turbo charge pressure of the turbo charger is lower than a predetermined pressure and the engine is under a vehicular start acceleration with a fuel injection quantity set to be equal to or larger than a predetermined fuel injection quantity.

24. A combustion control apparatus for an internal combustion engine as claimed in claim 23, wherein, for the switching of the combustion mode to the predetermined fuel combustion mode according to a combustion mode switching request determination of the combustion mode switching request determining section, a priority order for the combustion mode switch to the predetermined fuel combustion mode is preset among the requests to carry out the DPF regeneration, to carry out sulfur poisoning release for the NOx trap catalyst, and to carry out the NOx release and reduction process for the NOx trap catalyst in accordance with the accumulation quantities of the NOx and sulfur.

25. A combustion control apparatus for an internal combustion engine as claimed in claim 24, wherein fuel injection timings for the preliminary fuel combustion and for the main fuel combustion are set on the basis of a present engine speed (Ne) and a present fuel injection quantity (Q), the fuel injection timing for the main fuel combustion being gradually retarded toward the set fuel injection timing for the main fuel combustion, a correction coefficient of the fuel injection quantity for the main fuel combustion being increased as the fuel injection timing for the main fuel combustion becomes largely retarded to make the main engine torque equal to that in an ordinary combustion.

* * * * *